US012223496B2

United States Patent
Overholser et al.

(10) Patent No.: US 12,223,496 B2
(45) Date of Patent: *Feb. 11, 2025

(54) SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS

(71) Applicant: tZERO IP, LLC, Salt Lake City, UT (US)

(72) Inventors: Scott Overholser, Salt Lake City, UT (US); Robert Christensen, Sandy, UT (US); Nicole Sanders, Cottonwood Heights, UT (US); Justin Wilson, Draper, UT (US); Robert Valmassoi, New York, NY (US); Chase Lester, West Jordan, UT (US); Michael William Stuart Smith, Provo, UT (US); Andrew Warner, Midvale, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,613

(22) Filed: Nov. 27, 2023

(65) Prior Publication Data
US 2024/0095719 A1 Mar. 21, 2024

Related U.S. Application Data

(63) Continuation of application No. 17/546,446, filed on Dec. 9, 2021, now Pat. No. 11,829,997, which is a
(Continued)

(51) Int. Cl.
G06Q 20/36 (2012.01)
G06F 16/182 (2019.01)
(Continued)

(52) U.S. Cl.
CPC ....... *G06Q 20/367* (2013.01); *G06F 16/1834* (2019.01); *G06Q 20/0658* (2013.01);
(Continued)

(58) Field of Classification Search
CPC ............ G06Q 20/367; G06Q 20/0658; G06Q 20/3672; G06Q 20/389; G06Q 20/405;
(Continued)

(56) References Cited

U.S. PATENT DOCUMENTS 8,140,420 B2 3/2012 Buckwalter
9,177,313 B1 11/2015 Silverman
(Continued)

FOREIGN PATENT DOCUMENTS

CN 105956923 A 9/2016
JP 2018521437 A 8/2018
(Continued)

OTHER PUBLICATIONS

DTC Chills and Freezes, SEC.gov, May 1, 2012, 3 pages (Year: 2012).*
(Continued)

*Primary Examiner* — James D Nigh
(74) *Attorney, Agent, or Firm* — Fogg & Powers LLC

(57) ABSTRACT

A network node in a peer-to-peer network of nodes includes at least one processor, at least one memory, and at least one network interface. The at least one processor is configured to receive a request to transfer a security token and execute a plurality of compliance rules associated with the security token. At least one of the compliance rules is implemented using at least one smart contract. The at least one smart
(Continued)

contract references a global registry. The at least one processor is also configured to transfer the security token based on the execution of the compliance rules. The global registry includes personally identifiable information (PII) hash(es) for each of at least one investor associated with the transfer of the security token. The hashes are committed to the distributed ledger and updated when PII of a respective one of the at least one investor changes.

24 Claims, 12 Drawing Sheets

Related U.S. Application Data continuation of application No. 16/536,940, filed on Aug. 9, 2019, now Pat. No. 11,216,802.

(60) Provisional application No. 62/881,121, filed on Jul. 31, 2019, provisional application No. 62/871,543, filed on Jul. 8, 2019, provisional application No. 62/717,575, filed on Aug. 10, 2018.

(51) Int. Cl.
| | |
|---|---|
| *G06Q 20/06* | (2012.01) |
| *G06Q 20/38* | (2012.01) |
| *G06Q 20/40* | (2012.01) |
| *H04L 9/00* | (2022.01) |
| *H04L 9/32* | (2006.01) |
| *H04L 9/40* | (2022.01) |
| *G06Q 20/22* | (2012.01) |

(52) U.S. Cl.
CPC ....... *G06Q 20/3672* (2013.01); *G06Q 20/389* (2013.01); *G06Q 20/405* (2013.01); *H04L 9/3236* (2013.01); *H04L 63/20* (2013.01); *G06Q 2220/00* (2013.01); *H04L 9/50* (2022.05); *H04L 2209/56* (2013.01)

(58) Field of Classification Search
CPC ............. G06Q 20/065; G06Q 20/3678; G06Q 20/223; G06Q 20/382; G06Q 2220/00; G06F 16/1834; H04L 9/3236; H04L 9/50; H04L 63/20; H04L 63/12; H04L 2209/56; H04L 2463/102
USPC ......................................................... 705/65
See application file for complete search history.

(56) References Cited

U.S. PATENT DOCUMENTS

| | | | |
|---|---|---|---|
| 9,819,670 | B2 | 11/2017 | Bhat et al. |
| 11,216,802 | B2 | 1/2022 | Overholser et al. |
| 11,829,997 | B2 | 11/2023 | Overholser et al. |
| 2005/0131787 | A1 | 6/2005 | Monteleone et al. |
| 2007/0044143 | A1 | 2/2007 | Zhu et al. |
| 2011/0022521 | A1 | 1/2011 | Collinge et al. |
| 2012/0226776 | A1 | 9/2012 | Keebler et al. |
| 2016/0283941 | A1 | 9/2016 | Andrade |
| 2016/0321434 | A1 | 11/2016 | McCoy et al. |
| 2017/0011460 | A1* | 1/2017 | Molinari ............... H04L 9/3247 |
| 2017/0076382 | A1 | 3/2017 | Dintenfass et al. |
| 2017/0078094 | A1 | 3/2017 | Olson |
| 2017/0118095 | A1 | 4/2017 | Konecny |
| 2017/0223012 | A1 | 8/2017 | Xu et al. |
| 2017/0330174 | A1 | 11/2017 | DeMarinis et al. |
| 2018/0117447 | A1 | 5/2018 | Tran et al. |
| 2018/0240107 | A1* | 8/2018 | Andrade ............. G06Q 20/065 |
| 2018/0253464 | A1 | 9/2018 | Kohli et al. |
| 2019/0044714 | A1 | 2/2019 | Parker et al. |
| 2019/0251629 | A1* | 8/2019 | Gordon, III ......... G06Q 20/389 |
| 2019/0287107 | A1 | 9/2019 | Gaur et al. |
| 2019/0287175 | A1 | 9/2019 | Hill et al. |
| 2019/0303887 | A1 | 10/2019 | Wright et al. |
| 2019/0325044 | A1 | 10/2019 | Gray |
| 2019/0333033 | A1 | 10/2019 | Finlow-Bates |
| 2019/0333051 | A1* | 10/2019 | Brogger ............. G06Q 20/3678 |
| 2019/0349372 | A1* | 11/2019 | Smith ..................... G06F 21/31 |
| 2019/0377724 | A1* | 12/2019 | Pennington ............ G06Q 20/02 |
| 2020/0042989 | A1 | 2/2020 | Ramadoss et al. |
| 2020/0051043 | A1 | 2/2020 | Wilson et al. |
| 2020/0051069 | A1 | 2/2020 | Wilson et al. |
| 2020/0051072 | A1* | 2/2020 | Black ................... H04L 63/0236 |
| 2020/0127833 | A1 | 4/2020 | Konda et al. |
| 2020/0320222 | A1* | 10/2020 | Zhou .................... G06Q 50/265 |
| 2021/0082045 | A1 | 3/2021 | Assia et al. |
| 2022/0101307 | A1 | 3/2022 | Overholser et al. |

FOREIGN PATENT DOCUMENTS

| | | |
|---|---|---|
| WO | 2017145007 A1 | 8/2017 |
| WO | 2017145019 A1 | 8/2017 |
| WO | 2018065411 A1 | 4/2018 |
| WO | 2018127923 A1 | 7/2018 |
| WO | 2020033826 A1 | 2/2020 |

OTHER PUBLICATIONS

European Patent Office, "Extended European Search Report", from EP Application No. 19845961.2, from Foreign Counterpart to U.S. Appl. No. 16/536,866, Apr. 25, 2022, pp. 1 through 6, Published: EP.

U.S. Patent and Trademark Office, "Final Office Action", U.S. Appl. No. 16/536,866, Apr. 19, 2022, pp. 1 through 26, Published: US.

Intellectual Property Office of Singapore, "Invitation to Respond to Written Opinion and the Written Opinion", from SG Application No. 11202100410Y from Foreign Counterpart to U.S. Appl. No. 16/536,866, Oct. 18, 2022, pp. 1 through 9, Published: SG.

Japanese Patent Office, "Notice of Allowance" from JP Application No. 2021-170176, Jan. 4, 2023, from Foreign Counterpart to U.S. Appl. No. 16/536,866, pp. 1 through 3, Published: JP.

U.S. Patent and Trademark Office, "Decision on Appeal", U.S. Appl. No. 16/536,866, Sep. 1, 2023, pp. 1 through 22, Published: US.

U.S. Patent and Trademark Office, "Examiner's Answer to Appeal Brief", U.S. Appl. No. 16/536,866, Mar. 24, 2023, pp. 1 through 11, Published: US.

U.S. Patent and Trademark Office, "Notice of Allowance", U.S. Appl. No. 17/546,446, Jul. 24, 2023, pp. 1 through 34, Published: US.

U.S. Patent and Trademark Office, "Notice of Allowance", U.S. Appl. No. 16/536,866, Dec. 12, 2023, pp. 1 through 32, Published: US.

"Gas explosion as NEO not divisible", NEO, u/investorpatrick, https://www.reddit.com/r/NEO/comments/7qem0f/gas_explosion_as_neo_not_divisible/, 2018 or at least as early as Jun. 13, 2019, pp. 1-4.

"GoChain Development Updates—Upgradable Smart Contracts & Development Insights", GoChain, Dec. 31, 2018, pp. 1-4.

"Introduction to Smart Contracts a Simple Smart Contract", Solidity 0.509 documentation, at least as early as Jun. 17, 2019, pp. 1-11.

"List of All Functions", robin-stocks 1.0.0 documentation, at least as early as Jun. 13, 2019, pp. 1-14.

"Trading Glossary", TradeStation, at least as early as Jun. 13, 2019, pp. 1-29.

Araoz, "Proxy Libraries in Solidity", Zeppelin Blog, Mar. 6, 2017, pp. 1-6.

Augustol, "ERC930—Eternal Storage Standard", ethereum/EIPs, Mar. 14, 2018, pp. 1-7, Issue #930, GitHub.

Bayequentist, "Will the total supply of IOTA tokens ever increase?" Iota Beta, Nov. 30, 2017, pp. 1-3.

Beers, "Understand the What and Why of Stock Splits", Stock Trading Strategy & Education, Apr. 25, 2019, pp. 1-8, Investopedia.

(56) References Cited

OTHER PUBLICATIONS

Chawla, "How to write upgradeable contracts in solidity!", Apr. 25, 2018, pp. 1-15.
Editordavid, "Could Blockchain-Based Fractions of Digitized Stocks Revolutionize Markets", Slashdot, Mar. 10, 2019, pp. 1-14.
Eha, "Capital markets foe seeks an end run via blockchain", American Banker, Jan. 5, 2018, pp. 1-9.
Electronic Code of Federal Regulations (ECFR), "Regulation A—Conditional Small Issues Exemption", Sections 230.251 through 23.263, Apr. 20, 2015, pp. 1 through 22.
Electronic Code of Federal Regulations (ECFR), "Regulation D—Rules Governing the Limited Offer and Sale of Securities Without Registration Under the Securities Act of 1933", Sections 230.500 through 230.508, Oct. 9, 2020, pp. 1 through 22.
Electronic Code of Federal Regulations (ECFR), "Regulation S—Rules Governing Offers and Sales Made Outside the United States Without Registration Under the Securities Act of 1933", Sections 230.901 through 230.905, Dec. 17, 2007, pp. 1 through 16.
European Patent Office, "Extended European Search Report from EP Application No. 19848537.7", from Foreign Counterpart to U.S. Appl. No. 16/536,940, Mar. 10, 2022, pp. 1 through 10, Published: EP.
Ganti, "Reverse Stock Split", Corporate Finance & Accounting, Apr. 1, 2019, pp. 1-8, Investopedia.
Gucluturk, "The DAO Hack Explained: Unfortunate Take-off of Smart Contracts", at least as early as Jun. 17, 2019, pp. 1-8.
Hamlin, "This Week in Blockfolio Signal", Blockfolio Blog, Apr. 26, 2019, pp. 1-11.
Haris, "Upgradable Smart Contracts Made Easy", Hacker Noon, Oct. 19, 2018, pp. 1-10.
Intellectual Property Office of Singapore, "Invitation to Respond to Written Opinion and the Written Opinion", from SG Application 11202100708W, Oct. 19, 2022, from Foreign Counterpart to U.S. Appl. No. 16/536,940, pp. 1 through 13, Published: SG.
International Searching Authority, "International Search Report and Written Opinion from PCT Application No. PCT/US2019/045908", from Foreign Counterpart to U.S. Appl. No. 16/536,963, Dec. 12, 2019, pp. 1-13, Published: WO.
International Searching Authority, "International Search Report and Written Opinion from PCT Application No. PCT/US2019/045916", from Foreign Counterpart to U.S. Appl. No. 16/536,866, Dec. 3, 2019, pp. 1-9, Published: WO.
International Searching Authority, "International Search Report and Written Opinion from PCT Application No. PCT/US2019/045910", from Foreign Counterpart to U.S. Appl. No. 16/536,940, Dec. 5, 2019, pp. 1-13, Published: WO.
Japanese Patent Office, "Notice of Reason for Rejection from JP Application No. 2021-506681", from Foreign Counterpart to U.S. Appl. No. 16/536,940, Sep. 10, 2021, pp. 1 through 16, Published: JP.
Japanese Patent Office, "Notice of Reason for Rejection" from JP Application No. 2021-506681, from Foreign Counterpart to U.S. Appl. No. 16/536,940, Mar. 2, 2022, pp. 1 through 11, Published: JP.
Japanese Patent Office, "Notice of Reason for Rejection", from JP Application No. 2021-506759, Aug. 25, 2023, from Foreign Counterpart to U.S. Appl. No. 16/536,963, pp. 1 through 4, Published: JP.
Nadolinski et al., "Proxy Patterns", ZeppelinOS Blog, Apr. 19, 2018, pp. 1-16.
Omar et al., "Identity Management in IoT Networks Using Blockchain and Smart Contracts", IEEE Conference on Internet of Things, Green Computing and Communications, Cyber, Physical and Social Computing, Smart Data, Blockchain, Computer and Information Technology, Congress on Cybermatics, Jul. and Aug. 2018, pp. 994-1000, IEEE.
Palladino, "Malicious backdoors in Ethereum Proxies", Nomic Labs, Jun. 1, 2018, pp. 1-8.
Petethomas, "Blockchain startup R3 sues competitor Ripple", Hacker News Sep. 8, 2017, pp. 1-8.
Peyrott, "An Introduction to Ethereum and Smart Contracts: a Programmable Blockchain", Ethereum, Mar. 28, 2017, pp. 1-38, https://auth0.com/blog/an-introduction-to-ethereum-and-smart-contracts-part-2/.
Priyanka Ray, "Blockchain Technology", Fundamentals of Network Planning and Optimisation 2G/3G/4G: Evolution to 5G, 2018, pp. 337-346, John Wiley & Sons Ltd.
Reeder, "Upgradeable Smart Contracts are Here!", GoChain, at least as early as Jun. 17, 2019, pp. 1-5.
Reeder, "Upgradeable Smart Contracts", gochain/gip, Aug. 2, 2018, pp. 1-2, Issue #22, GitHub.
Sag, "Delaware General Corporations Law (DGCL) compatible share token", GitHub, Feb. 14, 2018, pp. 1-6.
Saitoh et al."All about the latest blockchain", Apr. 15, 2018, pp. 1 through 10.
sec.gov, "DTC Chills and Freezes", May 1, 2012, pp. 1 through 3, sec.gov.
Spagnuolo, "Upgradeability using Unstructured Storage", Technical, Apr. 13, 2018, pp. 1-8, ZeppelinOS Blog.
Tanner, "Summary of Ethereum Upgradeable Smart Contract R&D", Indorse, Mar. 5, 2018, pp. 1-9.
U.S. Patent and Trademark Office, "Advisory Action", U.S. Appl. No. 16/536,866, Jun. 8, 2021, pp. 1 through 4, Published: US.
U.S. Patent and Trademark Office, "Final Office Action", U.S. Appl. No. 16/536,866, Feb. 25, 2021, pp. 1 through 24, Published: US.
U.S. Patent and Trademark Office, "Final Office Action", U.S. Appl. No. 16/536,940, Jun. 7, 2021, pp. 1 through 21, Published: US.
U.S. Patent and Trademark Office, "Notice of Allowance", U.S. Appl. No. 16/536,940, Aug. 24, 2021, pp. 1 through 10, Published: US.
U.S. Patent and Trademark Office, "Office Action", U.S. Appl. No. 16/536,866, Oct. 27, 2020, pp. 1 through 17, Published: US.
U.S. Patent and Trademark Office, "Office Action", U.S. Appl. No. 16/536,866, Nov. 15, 2021, pp. 1 through 24, Published: US.
U.S. Patent and Trademark Office, "Office Action", U.S. Appl. No. 16/536,940, Jan. 14, 2021, pp. 1 through 43, Published: US.
U.S. Patent and Trademark Office, "Office Action", U.S. Appl. No. 16/536,963, May 25, 2021, pp. 1 through 32, Published: US.
Vogelsteller, "ERC-20 Token Standard", Nov. 19, 2015, pp. 1-4, GitHub.
Watkins, "Defining and Verifying Accredited Investors: Effect of Potential SEC Changes on North Carolina's Crowdfunding Statute, the NC PACES Act", North Carolina Banking Institute, Mar. 1, 2017, pp. 1-33, vol. 21, Issue 1, Article 22, UNC School of Law.
Japanese Patent Office, "Notice of Reason for Rejection", from JP Application No. 2022-139652, Nov. 27, 2023, from Foreign Counterpart to U.S. Appl. No. 16/536,940, pp. 1 through 5, Published: JP.

* cited by examiner

| TABLE OF BALANCES 105 | |
| --- | --- |
| A | 150 |
| B | 25 |
| C | 75 |

| TABLE OF BALANCES 105 | |
| --- | --- |
| A | 250 |
| B | 62 |
| C | 75 |

SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS

CROSS-REFERENCE TO RELATED APPLICATIONS

This application is a continuation of U.S. patent application Ser. No. 17/546,446 filed on Dec. 9, 2021, entitled "SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS", which claims the benefit of U.S. patent application Ser. No. 16/536,940 filed on Aug. 9, 2019, entitled "SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS", which claims the benefit of U.S. Provisional Patent Application Ser. No. 62/717,575 filed on Aug. 10, 2018, entitled "SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS"; U.S. Provisional Patent Application Ser. No. 62/871,543 filed on Jul. 8, 2019, entitled "SPLITTABLE SECURITY TOKEN"; and United States Provisional Patent Application Ser. No. 62/881,121 filed on Jul. 31, 2019, entitled "UPGRADEABLE SECURITY TOKEN"; all of which are hereby incorporated herein by reference.

This application is related to the following United States patent applications, which are hereby incorporated herein by reference:

U.S. patent application Ser. No. 16/536,866 filed on Aug. 9, 2019, entitled "SPLITTABLE SECURITY TOKEN", which is hereby incorporated herein by reference; and U.S. patent application Ser. No. 16/536,963 filed on Aug. 9, 2019 entitled "UPGRADEABLE SECURITY TOKEN", which is hereby incorporated herein by reference.

BACKGROUND

Currently, cryptographic tokens are used in connection with various aspects of blockchains. In examples, smart contracts implemented on an Ethereum blockchain enable the creation and issuance of tokens with complex behaviors attached to them. Ethereum Request for Comments 20 (ERC20) is a technical standard used for smart contracts (on the Ethereum blockchain) implementing tokens. The ERC20 standard is incorporated by reference in its entirety. Additionally, other methods may be implemented in order to satisfy Title 8 of the Delaware Code Relating to the General Corporation Law.

SUMMARY

A network node that includes at least one processor, at least one memory, and at least one network interface is disclosed. The network node is configured to be within a plurality of network nodes communicatively coupled in a peer-to-peer network of network nodes implementing a distributed ledger. The network node is configured to be communicatively coupled to at least one remotely located computing device through the at least one network interface. The at least one processor is configured to receive, from a remotely located computing device, a request to transfer a security token. The at least one processor is also configured to execute a plurality of compliance rules associated with the security token. At least one of the compliance rules is implemented using at least one smart contract. The at least one smart contract references a global registry. The at least one processor is also configured to transfer the security token based on the execution of the compliance rules.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
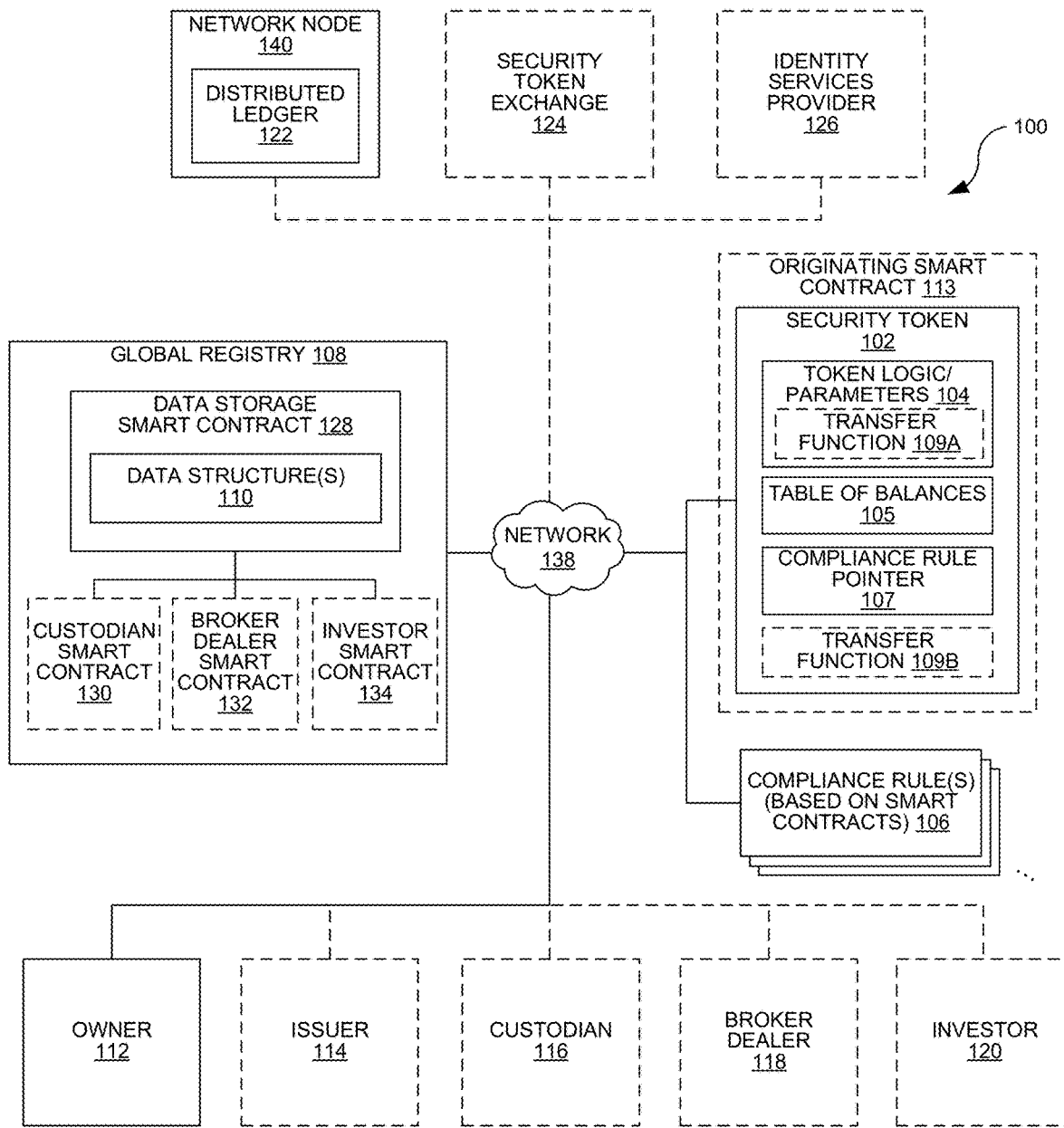
FIG. 1A is a block diagram of an example system using security tokens implementing smart-contract-based compliance rules that reference a global registry of investors.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Under regulations promulgated by the Securities and Exchange Commission (SEC), certain individuals may qualify to purchase tokens. In examples, this could apply to an asset that is regulated under SEC Regulation D, Regulation S, and/or Regulation A. Under these Regulations, certain individuals can qualify to transact at different times if they qualify under various exemptions to the regulations. Under U.S. federal securities laws, a company that offers or sells its securities must register the securities with the SEC or find an exemption from the registration requirements. For some exemptions, such as Rule 506 of Regulation D, a company may sell securities to an individual referred to as an accredited investor, which is defined in Rule 501 of Regulation D. There are also other exceptions under other parts of Regulation D, Regulation S, Regulation A, etc. As used herein, Regulation A refers to any of Rules 251-263 of Regulation A (as found in 17 C.F.R. § 230.251-230.263); Regulation D refers to any of Rules 501-506 of Regulation D (as found in 17 C.F.R. § 230.501-230.506); and Regulation S refers to any of Rules 901-905 of Regulation S (as found in 17 C.F.R. § 230.901-230.905).

Recently, the SEC has determined that cryptographic tokens may be considered securities based on individual circumstances. Many initial coin offerings (ICOs) are restricted to users that are outside the United States and other territories with strict securities regulation in order to avoid application of securities laws. However, this restriction limits the pool of investors and/or users that may purchase tokens.

In the examples described herein, a smart contract for a security token can reference (or include) at least one compliance rule to self-enforce compliance with applicable securities regulations. In examples, the at least one compliance rule includes commands to check for compliance with SEC Regulation D, Regulation S, or Regulation A. In some examples, at least one compliance rule verifies that specific users meet the requirements for purchase of a regulated token. In examples, at least one compliance rule determines whether the buyer qualifies as an accredited investors under Rule 501 of Regulation D.

One potential problem for security token transactions is the transfer of a security token to and/or from an investor that does not qualify under an exemption to the SEC regulations. Violations of SEC regulations can result in steep fines and/or criminal penalties. It is desirable to prevent security token transactions not complying with SEC regulations from being executed. Aside from possible fines and/or criminal penalties, an inadvertent violator of the SEC regulations may not be able to subsequently sell their security token(s) following a non-compliant purchase.

The examples described herein implement a self-enforcing security token. Specifically, the security token may include at least one compliance rule (or a pointer to compliance rule(s)) that reference a global registry of investors. The registry may include attributes of the investors so that the at least one compliance rule can determine whether a security token transaction complies, if necessary, with SEC regulations.

The examples described herein may be compatible with a custodial model where custodians hold security tokens on behalf of investors and/or broker dealers. However, the systems herein are also compatible with non-custodial models, e.g., where investors and/or broker dealers hold their security tokens directly with fewer or no intermediaries.

Various method names may be used herein as examples. It should be appreciated that any method names are illustrative in purpose, and not limiting. Additionally, optional devices and method steps are indicated with dashed lines in the Figures.

Figure 1B:
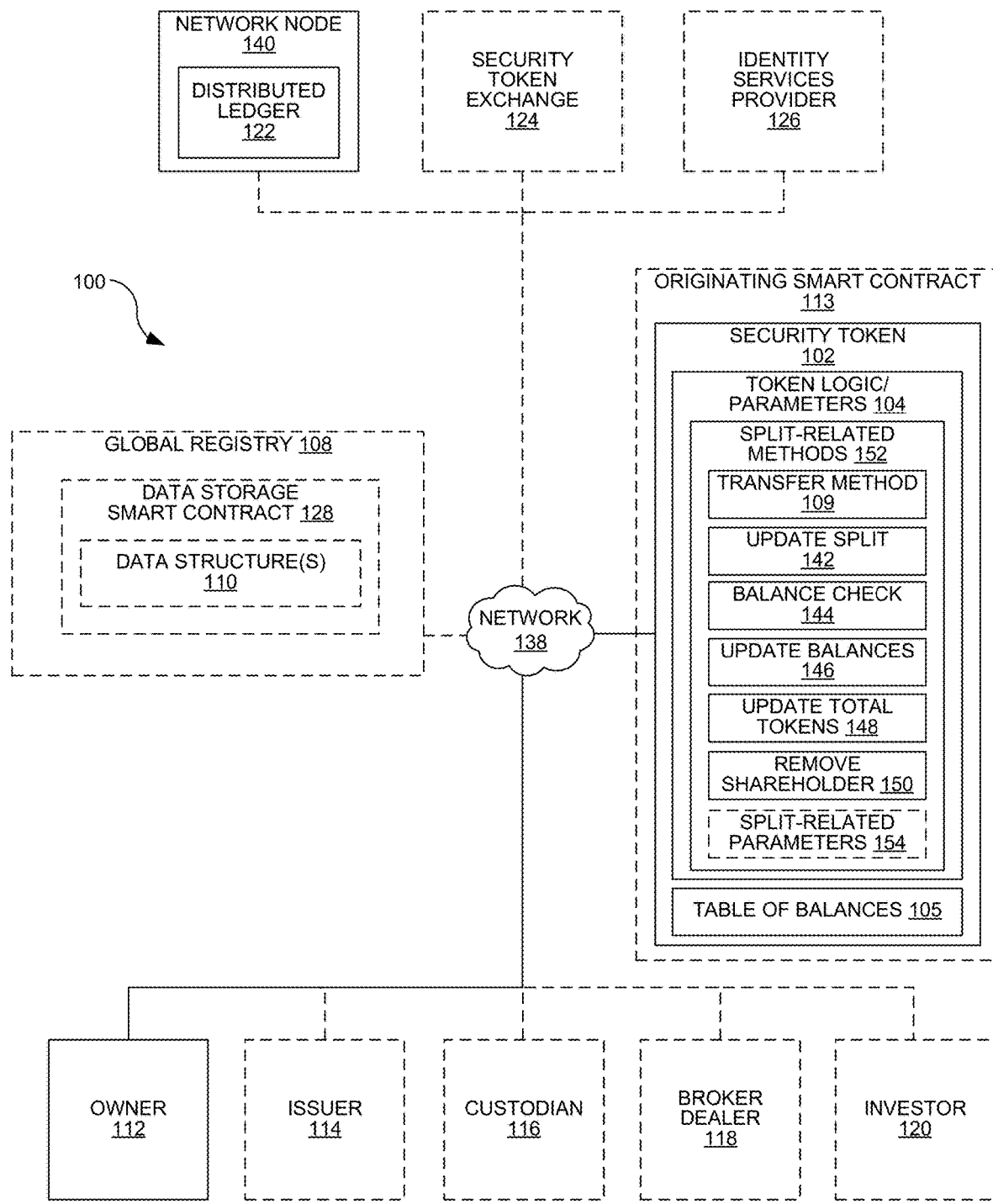
FIG. 1B is a block diagram of an example system using smart-contract-based security tokens that are splittable according to the present systems and methods.

FIG. 1A is a block diagram of an example system 100 using security tokens 102 implementing smart-contract-based compliance rules 106 that reference a global registry 108 of investors. FIG. 1B is a block diagram of an example system 100 using smart-contract-based security tokens 102 that are splittable according to the present systems and methods. The system 100 may include one or more security tokens 102, a global registry 108, a system owner 112, an issuer 114, and at least one network node implementing a distributed ledger 122 as shown in FIG. 1A. The system 100 may include one or more security tokens 102, a system owner 112, an issuer 114, and at least one network node 140 implementing a distributed ledger 122 as shown in FIG. 1B. The system 100 may also include various optional entities and/or devices, as described below.

A security token 102 is a cryptographic token that represents a security. A security may be any fungible, negotiable financial instrument that holds some type of monetary value. A security may represent an ownership position, a creditor relationship, or rights to ownership as represented by an option. Examples of securities include, without limitation, a piece of real property, at least one commodity, a piece of personal property, at least one bond, at least one derivative, at least one future, at least one fund, at least one currency fund, at least one exchange traded fund, at least one mutual fund, at least one index fund, at least one bond fund, at least one commodity fund, and/or at least one real estate fund. In examples, each security token 102 may represent a single share of a company. The security token 102 may be implemented as a smart contract on (e.g., stored on) a distributed ledger 122 (e.g., a blockchain). Various aspects of a given security token (e.g., issuance, transfers, etc.) may be regulated by the Securities and Exchange Commission (SEC) or other regulatory body.

In some configurations, each security token represents a single share of a company. Accordingly, a share of stock and a security token representing a share of stock may be referred to interchangeably. In examples, a forward stock split is a decision by a company's board of directors to increase the number of shares that are outstanding by issuing more shares to current shareholders (where the increased number of shares are proportionally less valuable). In examples, a forward split might be used to keep a share/token price remains under a certain value, e.g., to make it more attractive to prospective investors. In examples, stock splits may also occur in the opposite way, when a company does a reverse stock split. In examples, a reverse stock split is a type of corporate action that consolidates the number of existing shares of stock into fewer, proportionally more valuable, shares. In examples, a reverse split might be used to ensure that a share/token price remains above a certain value, e.g., to prevent the share/token from being de-listed from an exchange.

As security tokens become more widely used, the question of how to process stock splits in a blockchain ecosystem has started to emerge. As used herein, the term "split" is used to refer to a forward stock split (or a security token split where each security token represents a single share of a company) or a reverse stock split (or reverse security token split where each security token represents a single share of a company). The terms "security token" and "token" may be used interchangeably herein. The terms "security token holder," "token holder," and "shareholder" may be used interchangeably herein.

A record of various security token transactions may be stored in a distributed ledger. Security token transactions may require the transfer of some small quantity of cryptocurrency. In examples, if a security token is implemented on an Ethereum blockchain, transfers (e.g., purchases and sales) of the security token may include the transfer of one or more Ethereum tokens to record the transfer on the Ethereum blockchain. Therefore, manually changing the existing number of shares for all shareholders, in response to a split, can be expensive when there are many shareholders of a company's security tokens. Such expense would typically be borne by the issuing company and is undesirable.

Instead, the present systems and methods enable security tokens to be "split" in a way that minimizes costs. Specifically, as described below, the actual token balances of each shareholder may not be updated in response to a split. Instead, split values may be tracked and stored for each declared split, which indicate a multiplier that should be applied to the token balance for the shareholder. In order to reduce blockchain-related fees, the actual balances may not be updated in response to a split. Rather, the balances may be updated when security tokens are actually transferred following a split. Otherwise, the added split values can be used to determine split-updated balances without having to commit security token transactions to the distributed ledger.

The examples described herein may be compatible with a custodial model where custodians hold security tokens on behalf of investors and/or broker dealers. However, the systems herein are also compatible with non-custodial models, e.g., where investors and/or broker dealers hold their security tokens directly with fewer or no intermediaries.

Various method names may be used herein as examples. It should be appreciated that any method names are illustrative in purpose, and not limiting. Additionally, optional devices and method steps are indicated with dashed lines in the Figures.

An investor 120 may be a person or entity that has previously, or is considering, receiving or transferring a security token 102. In examples, an investor 120 may be a customer of a broker dealer 118 (or directly of the custodian 116), where the investor 120 may send orders to the broker dealer 118 (or directly to the custodian 116) relating to the purchase and/or sale of one or more security tokens 102. Alternatively, an investor 120 may be an "external investor" that does not need to connect to a broker dealer 118 or a custodian 116. Instead, an external investor may call the relevant methods described herein to initiate security token transactions, e.g., methods in the token 102 itself and/or the global registry 108, described below. An investor 120 may qualify under one or more exemptions to the SEC regulations (i.e., Regulation A, Regulation D, and/or Regulation S), thereby enabling the investor 120 to participate in security token 102 transactions as a buyer and/or a seller.

The term "security token transaction" or similar refers to any transfer of a security token 102, and may be used to describe an issuance, offering, gift, purchase, sale, and/or employee compensation carried out with the transfer of the security token 102. A security token 102 transaction may transfer a quantity of security tokens 102 from one or more input transaction addresses (belonging to one or more investors 120, broker dealers 118, and/or custodians 116) to one or more output transaction addresses (belonging to one or more investors 120, broker dealers 118, and/or custodians 116). As used herein, the terms "buyer" and "seller" refer to investors 120 that are transferring and receiving a security token 102, respectively. Security token transaction may be performed on-exchange or off-exchange.

In examples, compliance rules 106 may not be automatically triggered for some (e.g., on-exchange) transactions where the security token 102 itself is not updated to reflect the transaction, e.g., because a security token exchange 124 may enforce applicable SEC regulations. Optionally, the security token exchange 124 may independently call the compliance rules 106. In contrast, compliance rules 106 may be automatically triggered for peer-to-peer or other off-exchange transactions. In other words, security token 102 transactions invoking the transfer function 109 in the security token 102 may automatically trigger the compliance rules 106, while transactions not invoking the transfer function 109 in the security token 102 (e.g., on-exchange) may not automatically trigger the compliance rules 106 (although the compliance rules 106 may be called by means other than the transfer function 109 in the security token 102). For off-ledger transactions, if an investor 120 makes a deposit at a broker-dealer 118, the security tokens 102 will be held on deposit at a custodian 116 that is whitelisted (according to the SEC Regulations). The security token exchange 124 would then facilitate trades off-ledger. Compliance issues may be handled in a traditional manner. Withdrawals to an investor 120 wallet may also trigger one or more compliance rules 106.

Preferably, the system 100 includes at least one compliance rule 106 that is/are external to the security token 102. Alternatively, the at least one compliance rule 106 may be stored in the security token 102. Alternatively, configurations not using any compliance rules 106 are also possible, e.g., the default behavior might be to approve all transactions without respect to any compliance rules 106. Optionally, one or more security tokens 102 in the system 100 may reference one or more compliance rules 106, while one or more other security tokens 102 in the system 100 may not reference any compliance rules 106.

Additionally, the different compliance rule(s) 106 may be referenced depending on the types of entities involved in the security token 102 transaction. For example, custodian 116 to broker dealer 118 transactions, broker dealer 118 to custodian 116 transactions, custodian 116 to custodian 116 transactions, and/or broker dealer 118 to broker dealer 118 transactions (i.e., security token 102 transactions not involving investors 120) may reference few or no compliance rules 106. In contrast, security token 102 transactions involving investors 120 may reference more compliance rules 106 than security token 102 transactions not involving investors 120. Furthermore, different security tokens 102 may reference different compliance rules 106 that may or may not overlap, e.g., a first security token 102 may reference one or more first compliance rule(s) 106 relating to the exemptions to SEC Regulations A, D, and/or S, while a second security token 102 may only reference one or more second compliance rule(s) 106 relating to AML/KYC.

The broker dealer 118 may be a person or entity that purchases or sells security tokens 102 for its own account and/or on behalf of its customers. The term "onboarding" and its variants refers to the process of creating an account for a new customer, including collection of information, e.g., a broker dealer 118 may onboard an investor 120 as a new customer. The broker dealer 118 may be responsible for performing anti-money laundering and/or know-your-customer (AML/KYC) checks on its customers.

Specifically, an identity services provider 126 may be one or more computing devices that provide AML/KYC services. AML services may include one or more steps to ensure that a potential (or current) customer is not in violation of relevant laws and regulations designed to combat money laundering, i.e., AML services seek to ensure that a potential (or current) customer is not taking steps to obscure the source of funds that were received from illegal or unethical activities. KYC services may include one or more steps to gather, review, and monitor information related to the identity and/or financial dealings of a potential (or current) customer. In examples, KYC services may include collecting basic identity data (e.g., name, contact information, etc.), verifying that the customer is who they say they are, and/or ensuring that the customer is not on any law enforcement watch lists. KYC services may also include performing a soft credit check (e.g., based on the customer's basic identity data), analyzing a customer's transactional behavior, and/or monitoring the customer's account for fraudulent behavior based on the customer's transaction behavior. AML/KYC may be required under various federal, state, and/or local laws, including SEC regulations. This may include performing anti-money laundering and/or know-your-customer (AML/KYC) checks on its customers, e.g., provided by an identity services provider 126.

The issuer 114 may be a person or entity that instructs the owner 112 to issue security tokens 102, i.e., the owner 112 may own one or more originating smart contracts 113 that deploy/issue security tokens 102. The system 100 may include up to many issuers 114. In examples, the issuer 114 may be a company where each security token 102 represents a share of the company.

The broker dealer 118 may have an account with a custodian 116, i.e., a person or entity that holds custody, possession, and/or ownership of security tokens 102 for one or more broker dealers 118. The custodian 116 may be a person or entity that holds custody, possession, and/or ownership of security tokens 102 on behalf of many broker dealers 118 (which broker dealers 118 may have many investors 120 as its customers). The system 100 may include many custodians 116 and/or many broker dealers 118.

An owner 112 may be a person or entity that owns, deploys, re-deploys, and/or transfers the smart contracts 102, 106, 128-134 in the global registry 108. In examples, the owner 112 may use a method call (e.g., that is executed by a virtual machine) to the originating smart contract 113 to deploy/issue security tokens 102. The owner 112 may also be referred to as the administrator of the system 100. For example, the owner 112 may have authority to place custodian 116 freezes. Optionally, the owner 112 may have authority to place security token 102 freezes, broker dealer 118 freezes, and/or investor 120 freezes. The different freezes may be implemented by changing settings in the global registry 108, and will be discussed below. Additionally, or alternatively, the custodian 116 and/or broker dealer 120 may have authority to place one or more types of freezes. The system 100 may only have a one or more owners 112. Optionally, the owner 112 may provide data services describing the "market" for a security token 102 based on the security token 102 transactions executed in the system 100, e.g., a feed indicating volume of security token 102 transactions, transaction price for the most recent security token 102 transaction, etc.

As described above, the terms owner 112, issuer 114, custodian 116, broker dealer 118, and investor 120 may refer to a person or entity filling the various roles in the system 100. Alternatively, these terms may refer to a computing device used by the owner 112, issuer 114, custodian 116, broker dealer 118, and investor 120, respectively. When referring to a computing device, each of the owner 112, issuer 114, custodian 116, broker dealer 118, and investor 120 may be implemented with one or more processors that execute instructions in a memory on the respective computing device. Each respective computing device may be a mobile device, such as a cell phone or tablet, personal computer, or a server configured to send and receive instructions and/or other data to other computing devices, e.g., via a network 138, such as the Internet.

A security token exchange 124 may be a marketplace or a business entity that operates the marketplace (or one or more computing devices operated by a security token exchange 124) in which security tokens 102, commodities, derivatives and/or other financial instruments are traded. In examples, the security token exchange 124 may record successfully executed transactions on the distributed ledger 122. The security token exchange 124 may be custodial, i.e., where custodians 116 hold and transact security tokens 102 on behalf of broker dealers 118 and/or investors 120.

The network node 140 may be a computing device implemented using one or more processors that execute instructions stored in memory to implement functionality described herein. In examples, a network node 140 may run a virtual machine (e.g., Ethereum Virtual Machine) that executes any of the smart contracts described herein.

The term "distributed ledger" refers to an electronic ledger that is distributed across multiple interconnected network nodes 140 (i.e., computing devices executing instructions stored in memory), where more than one of the network nodes 140 stores a copy of the distributed ledger 122. In examples, one or more network nodes 140 in a peer-to-peer network may implement the distributed ledger 122.

The distributed ledger 122 may implement one or more blockchains to validate the data stored within the distributed ledger 122. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger 122, and may be public (e.g., viewable by anyone) or private (e.g., viewable only to authorized users or entities). Exemplary blockchains include, but are not limited to, the Bitcoin blockchain, the Ethereum blockchain, BigchainDB, Billon, Chain, Corda, Credits, Elements, Monax, Fabric, HydraChain, Hyperledger, Multichain, Openchain, Quorum, Ravencoin, Sawtooth, and Stellar. Preferably, the distributed ledger 122 is the public Ethereum blockchain, however, other implementations are possible. If a private blockchain is used, a hash of the private blockchain may be periodically committed to (i.e., recorded on) a public blockchain, e.g., the Ethereum blockchain or Bitcoin blockchain.

Additionally, or alternatively, the distributed ledger 122 may implement a directed acyclic graph (DAG), e.g., IOTA or Hashgraph that uses a gossip protocol to share information between network nodes 140 of the system 100. Furthermore, consensus may be reached in the distributed ledger 122 without proof-of-work and can instead use proof-of-stake. Furthermore, any Merkle tree (or hash tree) that connects different sets of data using cryptographic hashes may be implemented by the distributed ledger 122.

The term "wallet" refers to a software program, digital file, and/or memory used to store and/or manage digital assets, such as security tokens 102. Although the present systems and methods are described herein using security tokens 102, they are also compatible with any type of digital asset. In examples, a wallet may be defined by one or more private keys, one or more public keys derived from one or more private keys, and/or one or more transaction addresses derived from one or more private keys and/or one or more public keys. In examples, a wallet may be defined by one or more private account keys (and optional corresponding public account key(s)), each of which may have one or more child and/or grandchild transaction keys. The term "account" may be used to refer to an address on the distributed ledger 122, e.g., an Ethereum address in a hierarchical deterministic (HD) wallet.

Security tokens 102 may be issued privately, e.g., as part of a pre-initial public offering (pre-IPO) to a dark pool of investors that qualify under the relevant exemptions to the SEC regulations. Alternatively, security tokens 102 may be issued as part of an initial public offering (IPO) under SEC regulations. The owner 112 may deploy/issue one or more security tokens 102, e.g., with a security token offering (STO). Optionally, the issuer 114 may instruct the owner 112 to deploy/issue one or more security tokens 102, e.g., with a security token offering (STO). An STO may include deploying/issuing or selling a security where the security is represented by a security token 102. Optionally, an STO may include allocating them to one or more wallets, e.g., belonging to the owner 112 or issuer 114. In examples, all deployed security tokens 102 may be initially allocated to a wallet belonging to the owner 112 or issuer 114 before allocation to individual investors 120. Alternatively, the deployed security tokens 102 may be directly allocated to wallets owned by the individual investors 120. An STO may include one or more originating smart contracts 113 issuing one or more security tokens 102.

Following initial deployment and allocation, the security token 102 may be used to transfer the asset that the security token 102 represents from one party to another, e.g., on a security token exchange (STX) 124 or in a peer to peer (P2P) transaction (if permitted by the security token 102). Records of issuance and/or subsequent transactions of the security token 102 may be committed to (i.e., recorded in) the security token 102 itself and/or the distributed ledger 122.

The system 100 may be used to deploy, allocate and/or subsequently transfer various different types of security tokens 102. In examples, company A may deploy X security tokens 102 that each represent a share of company A and have a symbol AAAX, company B may deploy Y security tokens 102 that each represent a share of company B and have a symbol BBBX, and company C may deploy Z security tokens 102 that each represent a share of company C and have a symbol CCCX. Furthermore, security tokens 102 AAAX, BBBX, and CCCX may all be deployed, allocated, and/or tradeable in the same system 100.

Ethereum Request for Comments 20 (ERC20) is a standard defining a set of methods. To be compliant with ERC20, a cryptographic token (e.g., utility, cryptocurrency, or security) must implement these methods, although the owner of the token can implement the methods in their own way. One of the advantages of ERC20 is that each application, wallet, exchange, or interface doesn't have to be tailored to each specific token. Rather, if a project supports the ERC20 standard, it may support many different ERC20 tokens.

In order to comply with ERC20, the security token 102 may include token logic and/or parameters 104 that implements six required methods, including totalSupply( ) balanceOf( ) transfer( ) transferFrom( ) approve( ) and allowance( ) These required methods describe how tokens can be transferred and how token-related data can be accessed. The token logic/parameters 104 may also implement various events to comply with ERC20, e.g., Transfer( ) and Approval( ) These events describe formatting guidelines for transfers and approvals. For example, the Transfer( ) method/function 109A-B (in the token logic/parameters 104 or outside the token logic/parameters 104) may be called when a security token 102 transaction is requested, and the Transfer( ) function 109 may further call method(s) in one or more smart contracts 130-134 in the global registry 108 and/or compliance rule(s) 106, e.g., to check/verify that an address (e.g., Ethereum address) is associated with an investor 120, custodian 116, or broker dealer 118 in the system 100. The token logic/parameters 104 may also implement one or more optional methods to comply with ERC20, such as name( ) symbol( ) and/or decimals( ) These optional methods can be used to assign the security token 102 a name and a symbol, as well as define the number of decimals the security token 102 uses, respectively. These methods and events may be executed by a virtual machine (e.g., the Ethereum Virtual Machine) on a network node 140, and are further described in the ERC20 standard.

The token logic and/or parameters 104 may also include data that indicates the name of the security token 102, how many security tokens 102 of the same type were deployed or issued, and/or a symbol for the security token 102. In examples, the symbol of a security token 102 may be a multi-character (e.g., four or five) identifier for the security token 102 similar to a stock ticker symbol. The symbol of a security token 102 may be registered with Financial Industry Regulatory Authority (FINRA). The security token 102 symbol issued by a company may preferably be an extended version of the company's ticker symbol, e.g., by concatenating a particular character (e.g., Q, X, or Z) to the end of the company's ticker symbol.

The security token 102 may also include a table of balances 105. The table of balances 105 may indicate balances of all holders of a particular type of security tokens 102, e.g., the table of balances 105 may indicate what addresses (e.g., Ethereum addresses) hold what quantity of a security token 102. Instead of indexing by investor 120 (or custodian 116 or broker dealer 118) address, the table of balances 105 may be indexed in other ways, e.g., a hash of the investor's name, etc. The table of balances 105 for a security token 102 may be public, semi-public, or private, and may be anonymous such that balances of security tokens 102 held by a particular investor 120, custodian 116, or broker dealer 118 cannot be derived purely from publicly-available information.

The table of balances 105 may account for all security tokens 102 that have been deployed or issued. When a transfer of the security token 102 occurs (i.e., balances change), the table of balances 105 may be updated and distributed to each copy of the security token 102 stored on the different network nodes 140. Optionally, the table of balances 105 may also include a length of time a particular security token 102 has been owned by a current holder (i.e., investor 120 or custodian 116), e.g., based on previous transaction data of the particular security token 102. In examples, the transfer of a security token 102 may include updating the table of balances 105 in the security token 102. Table 1 is an example table of balances 105 that includes a key/value pair for each investor address:

TABLE 1

| Investor, Custodian, or Broker Dealer Address | Security Token Balance |
|---|---|
| 0x7d2a3d9f938e13cd947eb85a924bb34df8dd866 | 525 |
| 0x1d2a3d9f991e13c5da7ec05a1c7fe734df8dd84a | 50 |
| 0x1d2a3da66b8f13c5da7e9d5afc7fe734df8dd826 | 15000 |
| 0x1d2a3d9f938e13c4fa7ec0577c7fe734df8dd55e | 1100 |

In some examples, a table of balances 105 may be stored as a multi-object data structure (e.g., array) that is indexed by address (illustrated in the left column in Table 1) with the value at each index being a security token balance (illustrated in the right column in Table 1) associated with the address.

However, security tokens 102 (unlike other types of tokens) may be regulated by the Securities and Exchange Commission (SEC) in the United States. Accordingly, it may be desirable to satisfy Title 8 of the Delaware Code Relating to the General Corporation Law, which is important because many publicly traded companies are incorporated in Delaware. Additional methods satisfying Title 8 are referred to as Title 8 methods herein and may be implemented in a variety of ways, e.g., with or without Ethereum Request for Comments 884 (ERC884). Specifically, the Title 8 methods allows for the creation of tokens where each token represents a single share issued by a Delaware corporation, i.e., such tokens may be designed to represent equity issued by any Delaware corporation, whether private or public.

Accordingly, the token logic and/or parameters 104 may implement one or more Title 8 methods (beyond the six required by ERC20): including add Verified( ) remove Verified( ) update Verified( ) cancelAndReissue( ) isVerified( ) isHolder( ) holderCount( ) holderAt( ) hasHash( ) isSuperseded( ) and/or getCurrentFor( ) The token logic/parameters 104 may also implement one or more events (beyond the six required for ERC20 compatibility), e.g., verifiedAddressAdded( ) VerifiedAddressRemoved( ) VerifiedAddressUpdate( ) and/or VerifiedAddressSuperseded( ) These Title 8 methods and events may be executed by a virtual machine on a network node 140.

However, SEC regulations impose additional requirements for security tokens 102 that are not required or enforced by ERC20 and/or the Title 8 methods. In other words, ERC20 and Title 8, individually and combined, do not cause security tokens 102 to automatically self-enforce compliance with SEC regulations.

With reference to FIG. 1A, in order to self-enforce compliance with SEC regulations, the system 100 may implement functionality beyond the Title 8 methods. Specifically, the security token 102 may include at least one compliance rule pointer 107, where each compliance rule pointer 107 indicates the address of at least one compliance rule 106 (that is implemented using one or more smart contracts). The at least one compliance rule pointer 107 may be updated, if necessary, to point to updated compliance rule(s) 106.

At least one of the compliance rules 106 references the global registry 108 (that is external to the security token 102), i.e., at least one of the compliance rules 106 accesses information stored in a data storage smart contract 128. By storing the compliance rules 106 outside of the security token 102, the at least one compliance rule 106 may be updated without modifying the security token 102 itself, e.g., if SEC regulations change and the at least one compliance rule 106 need to be updated. Alternatively, the at least one compliance rule 106 may be included in the security token 102 itself, in which case modifying (e.g., destroying and re-deploying) at least one compliance rule 106 would require modifying the security token 102. Optionally, security token 102 transactions not using any compliance rules 106 are also possible, e.g., the default behavior might be to approve all transactions without respect to any compliance rules 106

The term "smart contract" refers to a set of conditional logic that may be implemented in software, e.g., one or more sequential steps that are executed in response to one or more relevant conditions being satisfied. A smart contract may be stored at an address of a distributed ledger 122. In examples, smart contracts may be programmed in the Solidity programming language. Smart contracts may be executed by a processor on a network node 140, e.g., that is running a virtual machine, such as the Ethereum Virtual Machine (EVM). Multiple types of security tokens 102 (e.g., issued by different companies) can access the same smart-contract-based compliance rule(s) 106, but more preferably each type of security token 102 will use one or more unique smart-contract-based compliance rule(s) 106.

The compliance rules 106 may ensure that any transaction involving the security token 102 complies with the relevant SEC regulations. In examples, the compliance rules 106 may (1) verify that the buyer and/or the seller of the security token 102 qualify under at least one of SEC Regulations A, D, and S; (2) verify that AML and/or KYC services have been performed for the buyer and/or seller; (3) verify that no freezes have been placed (discussed below) that would prevent the security token 102 from being transferred; and/or (4) verify that the particular security token 102 is not in a blackout period, i.e., a restriction that prevents the seller from selling the security token 102 for a certain period of time (e.g., one year) following acquisition of the security token 102. Verifying whether the security token 102 is in a blackout period may include traversing previous security token 102 transactions in the distributed ledger 122 to find the acquisition date that the seller acquired the security token 102, and comparing the acquisition date to the current date (e.g., by accessing a server's date) to determine the length of time that the seller has held the security token 102. If the length of time (that the seller has held the security token 102) equals or exceeds an applicable blackout period, the security token 102 is not in the blackout period.

At least one of the compliance rule(s) 106 may reference an external, global registry 108, e.g., via the network 138. The global registry 108 may be a collection of smart contracts 128-134. The smart contracts 128-134 include a data storage smart contract 128 that stores data. The data stored in the data storage smart contract 128 may be relevant to compliance with SEC regulations (such as indications of whether an investor 120 qualifies under exemptions to the SEC Regulations); personally identifiable information (PII) of an investor 120; an indication whether AML/KYC has been performed for the investor 120; and/or whether a freeze has been placed on a security token 102, custodian 116, broker dealer 118, and/or investor 120.

The data storage smart contract 128 may interface with a custodian smart contract 130, a broker dealer smart contract 132, and/or an investor smart contract 134 in the global registry 108. One advantage of implementing the global registry 108 using multiple smart contracts 128-134 is that it may be cheaper, in terms of transaction costs, to replace a portion of the code (e.g., the broker dealer smart contract 132) instead of the replacing the code encompassed by all the smart contracts 128-134, i.e., the cost of fixing bugs in the code may be reduced. Splitting the global registry 108 into multiple smart contracts 128-134 may also enable the global registry to comply with size limitations that may be imposed in certain distributed ledgers 122, e.g., Ethereum.

The smart contracts 128-134 in the global registry 108 may be stored on a public distributed ledger 122. Alternatively, the global registry 108 could be a traditional database that stores attributes of the security tokens 102, custodians 116, broker dealers 118, and/or investors 120 in the system 100, e.g., stored on a single computing device. Alternatively, the global registry 108 may be a database that stores attributes of the security tokens 102, custodians 116, broker dealers 118, and/or investors 120 on the distributed ledger 122 without utilizing smart contracts 128-134.

Optionally, an interface smart contract (not shown) may implement at least one method that can be used to access the custodian smart contract 130, the broker dealer smart contract 132, and/or the investor smart contract 134. In other words, the optional interface smart contract may act as an interface to other devices in the system 100. The methods implemented by the custodian smart contract 130 may be called by the owner 112. The broker dealer smart contract 132 may implement at least one method to add, remove, and/or update investor elements in one or more data structures 110 in the global registry 108. In examples, the methods implemented by the broker dealer smart contract 132 may be called by the custodian 116. The methods implemented by the investor smart contract 134 may be called by a broker dealer 118.

Therefore, in the preferred (but not only) configuration, only the owner 112 may call the methods implemented by the custodian smart contract 130, only a custodian 116 may call the methods implemented by the broker dealer smart contract 132, and only a broker dealer 118 may call the methods implemented by the investor smart contract 134. Optionally, more than the owner 112, custodian 116, and broker dealer 118 can call the methods implemented in the custodian smart contract 130, the broker dealer smart contract 132, and the investor smart contract 134, respectively. For example, a Transfer( ) function 109 or other smart contracts in the security token 102 (e.g., in the token logic/parameters 104) may call one or more methods in the custodian smart contract 130, the broker dealer smart contract 132, and/or the investor smart contract 134.

Each of the custodian smart contract 130, the broker dealer smart contract 132, and the investor smart contract 134 can read or write (assuming correct data permissions) data in the data storage smart contract 128. Specifically, one or more investor elements, custodian elements, and/or broker dealer elements may be created, modified, and/or removed from one or more data structures 110 in the data storage smart contract 128.

Furthermore, the global registry 108 may include more than one custodian smart contract 130, broker dealer smart contract 132, and/or investor smart contract 134. For example, the global registry 108 may include a first custodian smart contract 130, broker dealer smart contract 132, and/or investor smart contract 134 for security tokens 102 relating to a first asset type (e.g., equity shares), and a second custodian smart contract 130, broker dealer smart contract 132, and/or investor smart contract 134 for security tokens 102 relating to a second asset type (e.g., bonds).

In examples, one or more of the custodian smart contract 130, broker dealer smart contract 132, and/or investor smart contract 134 may be a pointer to other smart contract(s) (not shown) that implement the functionality. Such a configuration would allow for partial (and therefore cheaper) updates to the smart contracts 130-134 in the global registry 108, i.e., the pointer in the custodian smart contract 130, broker dealer smart contract 132, and/or investor smart contract 134 could remain constant, so the calling security tokens 102 or entities 112-120 would not have to be updated each time the one of the smart contracts 130-134 is updated. In other words, one or more smart contracts 130-134 may each point to one or more dynamic (i.e., updatable) smart contracts (not shown) in the global registry 108, e.g., the dynamic smart contract(s) could be destroyed and/or re-deployed without changing the particular smart contract 130-134 that is called by other smart contracts or entities in the system 100.

Figure 2A:
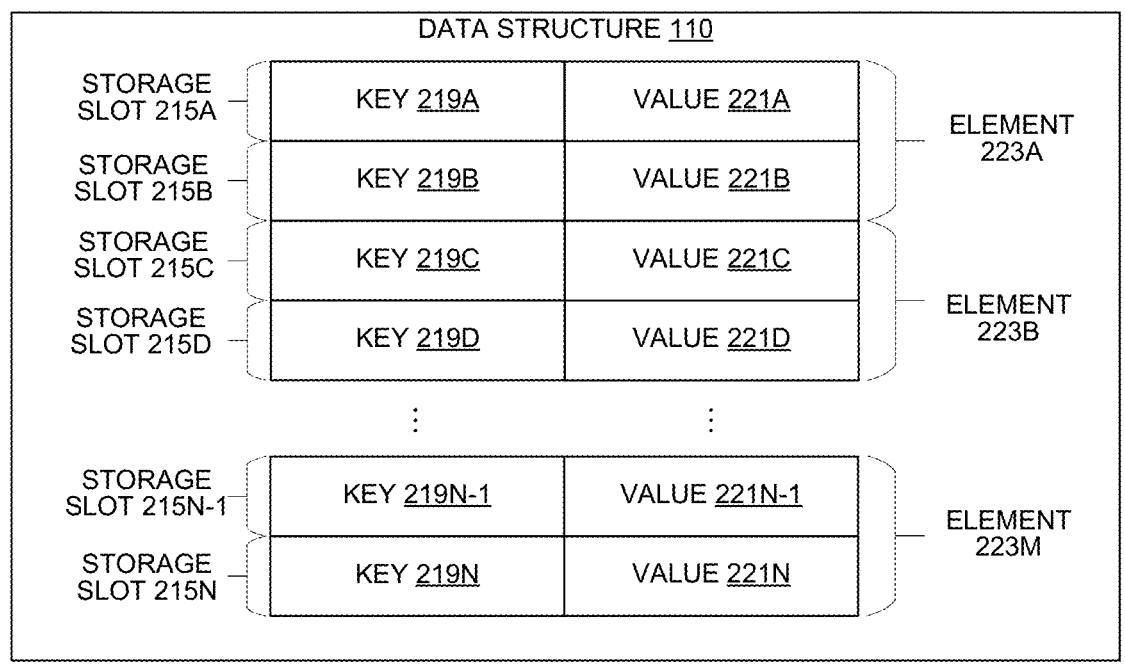
FIG. 2A is a block diagram illustrating a data structure used in the systems illustrated in FIGS. 1A-1B.

A data structure 110 may store at least one investor element, each with personally identifiable information (PII) about a particular investor. Additionally, each investor element may include an accreditation date (i.e., the date that a determination was made that the investor 120 qualifies under one or more exemptions to the SEC Regulations), an expiration date of accreditation, an indication whether a freeze has been placed on the investor 120, an address (e.g., Ethereum address) of the investor's broker dealer 118, and/or the investor 120 country of origin. Optionally, each investor element may include other parameters, e.g., (1) whether the investor 120 qualifies under SEC Regulation A; (2) whether the investor 120 qualifies under SEC Regulation D; (3) whether the investor 120 qualifies under SEC Regulation S; (4) whether AML/KYC been performed by the broker dealer 118; and/or (6) a length of time a particular security token 102 has been owned by the investor 120, and any information that is relevant to compliance with SEC regulations governing the transfer of the security token 102. The attributes in an investor element (e.g., a value in a slot in an investor element) may be stored as comma-separated values, a hash table, a mapping, a dictionary, and/or key/value pairs, etc., e.g., as illustrated in FIG. 2A.

In examples, the data storage smart contract 128 may store at least one investor element for each investor 120. The data storage smart contract 128 may store multiple investor elements for a particular investor 120 if the investor 120 is a customer of multiple different broker dealers 118, i.e., the data storage smart contract 128 may store a first investor element for the investor 120 according to information collected by a first broker dealer 118 during a first onboarding, a second investor element for the investor 120 according to information collected by a second broker dealer 118 during a second onboarding, etc. In examples, only the broker dealer 118 associated with the investor element (or their agent) may update the information for that investor element, i.e., to prevent other broker dealers 118 from interfering with data (relevant to SEC Regulation compliance) that is collected by a broker dealer 118. Different investor elements for the same investor 120 (at different broker dealers 118) may be stored in the same data structure 110. Storing an investor element for each instance of the investor 120 per broker dealer 118 (that the investor 120 has an account with) may allow each broker dealer 118 to be responsible for its own compliance processes without having to rely information collected by other broker dealers 118.

It should be noted that, while the data storage smart contract 128 is described herein as storing a separate investor element for each instance of the investor 120 per broker dealer 118 that the investor 120 has an account with, other configurations in which the data storage smart contract 128 stores a single investor element (for an investor 120 having accounts with multiple broker dealers 118) are possible.

One or more of the attributes in an investor element may be derived from information about the investor 120 (e.g., under SEC Rule 17a-3(17)) collected by the broker dealer 118 during onboarding, e.g., customer name; tax identification number (e.g., Social Security number); address; telephone number; date of birth; driver's license, passport information or information from other government-issued identification; employment status and occupation; whether the customer is employed by a brokerage firm; annual income; net worth; and/or account investment objectives. Additionally, or alternatively, one or more pieces of personally identifiable information (PII) may be stored as attributes in an investor element. PII may include any data that can be used to distinguish individual identity, e.g., name, address, email address, tax identification number, etc. PII may be included in the data collected from an investor 120 by each broker dealer 118 during onboarding (e.g., as part of SEC Rule 17a-3(17) data collection) or otherwise. In examples, the PII (or the PII padded with filler data) may be encrypted into a PII hash that is stored as an investor attribute 110 in an investor element. Alternatively, the investor 120 may encrypt the PII (or the PII padded with filler data) into a PII hash that is stored as an investor attribute 110 in an investor element, e.g., if the investor 120 is an external investor that doesn't connect through a broker dealer 118 or a custodian 116.

Since the qualification status of an investor 120 (under exemptions to the SEC regulations) can change over time, the data storage smart contract 128 may be updated. In examples, updating the individual entries may include adding, removing, or modifying investor elements when appropriate. In examples, when a broker dealer 118 onboards an investor 120, a new investor element may be created and stored, e.g., in the data storage smart contract 128. In examples, when an investor 120 changes accreditation status (or information from which accreditation status is derived, e.g., income, net worth, etc.) or personally identifiable information (PII), the PII hash in the investor element for the investor 120 (and broker dealer 118) may be updated. In examples, when the investor 120 closes their account with a broker dealer 118, the corresponding investor element may be removed from the data storage smart contract 128.

As mentioned above, the data storage smart contract 128 may include an investor element for each instance of the investor 120 per broker dealer 118 that the investor 120 has an account with, i.e., the data storage smart contract 128 may store multiple investor elements for an investor 120 with accounts at multiple broker dealers 118. In examples, the investor element(s) for an investor 120 may only be created, updated, and/or removed by a broker dealer 118 that the investor 120 is associated with, however, other configurations are possible. Accordingly, each broker dealer 118 can preferably create, modify, or remove an investor element that is associated with investors 120 that are customers of the respective broker dealer 118. Creation, modification, and/or removal of an investor element may be performed by the investor smart contract 134. A broker dealer 118 may call a method implemented by the investor smart contract 134 directly. Alternatively, the broker dealer 118 may call a method implemented by an optional interface smart contract, and the optional interface smart contract may call a method implemented by the investor smart contract 134. Alternatively or additionally, an external investor may create, modify, and/or remove an investor element by calling method(s) implemented by the investor smart contract 134 directly or by an optional interface smart contract.

Optionally, one or more other types of elements may be stored in the data storage smart contract 128 that include attributes about various actors in the system 100. In examples, the other elements (i.e., other than investor elements) may include at least one custodian element, at least one broker dealer element, and/or at least one security token element. In examples, the broker dealer element for a broker dealer 118 may only be created, updated, and/or removed by a custodian 116 (e.g., by calling the broker dealer smart contract 132) that the broker dealer 118 is associated with, however, other configurations are possible. In examples, the custodian element for a custodian 116 may only be created, updated, and/or removed by the owner 112 (e.g., by calling the custodian smart contract 130), however, other configurations are possible. Optionally, an issuer element and/or security token exchange element may be stored for every issuer 114 and/or security token exchange 124 in the system. The attributes in one of the other elements (e.g., a value in a slot in an element) may be stored as comma-separated values, a hash table, a mapping, a dictionary, and/or key/value pairs, etc.

As will be discussed below, the system 100 may enable various freezes relating to the security token 102. In examples, the system 100 may allow a security token 102 freeze, a custodian 116 freeze, and/or an investor 120 freeze. Optionally, the system 100 may enable a broker dealer 118 freeze, a security token exchange 124 freeze, and/or an issuer 114 freeze. The freezes may use and/or modify attributes in one or more investor elements and/or one or more other types of elements, depending on the type of freeze. In examples, only investor 120 freezes, custodian 116 freezes, and security token 102 freezes are possible (not broker dealer 118 freezes, security token exchange 124 freezes, and/or issuer 114 freezes).

With reference to FIG. 1B, after a company has issued shares (in the form of security tokens), it may decide to change the number of existing shares using a split. A simple way to perform a split action on issued security tokens 102 would be to traverse through the list of addresses holding at least one security token 102 (e.g., in a table of balances 105) and update their token balances one by one. With a security token 102 running on Ethereum, this is not practical because a small blockchain-related fee (also referred to as "gas") is required to conduct a transaction or execute a method in a smart contract on a blockchain platform, e.g., "gas" is the pricing value required to successfully conduct a transaction or execute a smart contract on the Ethereum blockchain platform. Furthermore, separate transactions (instead of in batches) may be required to update the balance of each individual token holder, due to upper gas limits. This process could be expensive and take a long time to complete. Instead, the present systems and methods may simulate splits until an actual transfer of security token(s) 102 is made, thereby saving gas on unnecessary transactions. In other words, the functionality described herein can implement splits at a lower cost than updating the token balances by manually iterating through the shareholder list (e.g., in a table of balances 105).

In order to enable split functionality, the system 100 may implement functionality beyond ERC20 and the Title 8 methods. In examples, in addition to implementing methods required by ERC20 and/or the Title 8 methods, the security token 102 may implement the following split-related methods 152: (1) the transfer( ) method 109 (mentioned above) that transfers a quantity of security tokens 102 from an input address to at least one output address, while accounting for splits of the security token 102 that have taken place, but are not yet accounted for in the token balances; (2) an update split method 142 that initiates a split of a token (updateSplit( )); (3) a balance check method 144 that determines a security token balance for a token holder that accounts for one or more splits of the token (balanceOf( )), without actually updating token balances in the list addresses holding tokens (e.g., the table of balances 105); (4) an update balances method 146 to update token balances of one or more token holders based on one or more splits of the token (updateBalances( )); (5) an update total tokens method 148 to update the total amount of outstanding tokens following one or more splits of the token (splitTotalSupply( )); and/or (6) a remove shareholder method 150 to remove fractional shareholders following a split (removeShareholder( )). The split-related methods 152 may be executed by a processor on a network node 140, e.g., that is running a virtual machine, such as the Ethereum Virtual Machine (EVM).

Alternatively, instead of the security token 102 implementing the split-related methods 152, the token logic and/or parameters 104 in the security token 102 may include pointer(s) (not shown) that indicate the address(es) of one or more split-related methods 152 implemented outside of the security token 102, e.g., the actual split-related methods 152 may be implemented in the optional global registry 108 described below. In this alternative configuration, the split-related methods 152 may be updated, if necessary, without modifying the security token 102 itself.

In some configurations, as described below, a split-related method 152 may itself call one or more other split-related method 152. For example, the transfer( ) method 109 might call the update balances method 146, which calls the balance check method 144 for the input and output addresses. Furthermore, the split-related methods 152 may be executed on network node 140 implementing the distributed ledger 122.

When determining the token balance for a shareholder, a quick calculation may be performed (as part of the balanceOf( ) method 144) to obtain the split-updated balance (the balance after the split(s) is/are applied, if applicable), which is also called newBalance herein. In examples, this method 144 is free to execute on the blockchain because it is read-only, i.e., it does not require any gas (blockchain-related fee) to execute. Then, when a transfer is requested (e.g., the transfer( ) method 109 in the security token 102 is called), the actual token balance is updated for both sides of the trade (input address and output address(es)), and the desired number of tokens is transferred, thus bringing the shareholders' token balances up-to-date with the current split. A record of the security token transaction may be recorded on the distributed ledger 122 during the transfer( ) method 109.

In addition to split-related methods 152, the token logic and/or parameters 104 (in the security token 102 itself) may also include one or more split-related parameters 154. Specifically, when a stock goes through a split (including reverse splits), an event is recorded. Any subsequent splits are also tracked/recorded in the order that they occurred. The split events may be recorded in a data structure (called splits herein) using the updateSplit( ) method, where the data structure (splits) has an object for each split in the token's history. For each shareholder/token holder, the last split that is reflected in their token balance is also tracked. The last split may be recorded in a data structure called holdersSplit. On a reverse split, an audit of the shareholder list may be performed to determine the number of tokens (cashedOutTokenQuantity) that will be eliminated due to partial tokens not being allowed (according to regulatory and/or technical limitations). The split-related parameters 154 may also include an index (currentSplitIndex) indicating the most recent split for the token 102 (without respect to any specific token holder). It should be noted that the specific split-related parameters 154 may be implemented using any suitable data structures, e.g., a struct, array, linked list, integer, etc. Furthermore, one or more of the split-related parameters 154 may not be used in some implementations, e.g., if the functionality described herein can be accomplished without (or with a different) parameter.

The split-related parameters 154 are implemented in the security token 102, e.g., in each security token 102 on each network node 140 implementing the distributed ledger 122. In some configurations, where a split-related parameter 154 is being updated, stored, adjusted, removed, changed, added, or any variants herein, it may be happening on a distributed ledger 122, e.g., an Ethereum blockchain. In some configurations, updating a split-related parameter 154 may include executing a transaction on the distributed ledger 122.

The system 100 may also include an optional global registry 108, which includes one or more smart contracts, such as a data storage smart contract 128 that stores data. The data stored in the data storage smart contract 128 may include a mapping of addresses (in the table of balances 105) to investors 120, personally identifiable information (PII) of an investor 120, and/or any other investor information that may be used. Optionally, pointer(s) in the token logic and/or parameters 104 reference split-related methods 152 implemented in the optional global registry 108. Additionally, in some configurations, one or more split-related parameters 154 may be stored in the data storage smart contract 128.

The smart contracts 128 in the global registry 108 may be stored on a public distributed ledger 122. Alternatively, the global registry 108 could be a traditional database that stores attributes of the security tokens 102, custodians 116, broker dealers 118, and/or investors 120 in the system 100, e.g., stored on a single computing device. Alternatively, the global registry 108 may be a database that stores attributes of the security tokens 102, custodians 116, broker dealers 118, and/or investors 120 on the distributed ledger 122 without utilizing smart contracts 128.

A data structure 110 in the data storage smart contract 128 may store at least one investor element, each with information about a particular investor 120. Additionally, each investor element may include an address (e.g., Ethereum address) of the investor's broker dealer 118, and/or various regulatory accreditation information (such as whether AML/KYC has been performed for the investor 120, the investor 120 country of origin, length of time a particular security token 102 has been owned by the investor 120, etc.). The attributes in an investor element (e.g., a value in a slot in an investor element) may be stored as comma-separated values, a hash table, a mapping, a dictionary, and/or key/value pairs, etc., e.g., as illustrated in FIG. 2A. Each investor element may be created by an owner 112, issuer 114, broker dealer 118, custodian 116, and/or an investor 120 (e.g., if the investor 120 is an external investor).

In examples, the data storage smart contract 128 may store at least one investor element for each investor 120. The data storage smart contract 128 may store multiple investor elements for a particular investor 120 if the investor 120 is a customer of multiple different broker dealers 118. In examples, only the broker dealer 118 associated with the investor element (or their agent) may update the information for that investor element. Different investor elements for the same investor 120 (at different broker dealers 118) may be stored in the same data structure 110. Alternatively, other configurations in which the data storage smart contract 128 stores a single investor element (for an investor 120 having accounts with multiple broker dealers 118) are possible. Optionally, an interface smart contract (not shown) may be used to add, remove, and/or update investor elements in one or more data structures 110.

The attributes in an investor element may include information about the investor 120, e.g., collected by the broker dealer 118 during onboarding. Such information may include: customer name; tax identification number (e.g., Social Security number); address; telephone number; email address; date of birth; driver's license, passport information or information from other government-issued identification; employment status and occupation; whether the customer is employed by a brokerage firm; annual income; net worth; account investment objectives; and/or any other data that can be used to distinguish individual identity. The investor elements in the data storage smart contract 128 may be updated, as appropriate. For example, when the investor 120 closes their account with a broker dealer 118, the corresponding investor element may be removed from the data storage smart contract 128. Additionally or alternatively, the investor 120 may be responsible for creating, updating, and/or removing the attributes in the investor element 223 associated with itself, e.g., if an investor 120 is an external investor.

As mentioned above, the data storage smart contract 128 may include an investor element for each instance of the investor 120 per broker dealer 118 that the investor 120 has an account with, i.e., the data storage smart contract 128 may store multiple investor elements for an investor 120 with accounts at multiple broker dealers 118. In examples, the investor element(s) for an investor 120 may only be created, updated, and/or removed by a broker dealer 118 that the investor 120 is associated with, however, other configurations are possible. Accordingly, each broker dealer 118 can preferably create, modify, or remove an investor element that is associated with investors 120 that are customers of the respective broker dealer 118.

Optionally, one or more other types of elements may be stored in the data storage smart contract 128 that include attributes about various actors in the system 100. In examples, the other elements (i.e., other than investor elements) may include at least one custodian element, at least one broker dealer element, and/or at least one security token element. In examples, the broker dealer element for a broker dealer 118 may only be created, updated, and/or removed by a custodian 116 that the broker dealer 118 is associated with, however, other configurations are possible. Optionally, an issuer element and/or security token exchange element may be stored for every issuer 114 and/or security token exchange 124 in the system. The attributes in one of the other elements (e.g., a value in a slot in an element) may be stored as comma-separated values, a hash table, a mapping, a dictionary, and/or key/value pairs, etc.

FIG. 2A is a block diagram illustrating a data structure 110 used in the system 100 illustrated in FIG. 1. One or more data structures 110 may be stored in the data storage smart contract 128. Each data structure 110 may include one or more elements 223A-M, where each element 223 corresponds to (i.e., include information about) a particular custodian 116, broker dealer 118, or investor 120. Optionally, security token elements 223 may also be stored in one or more data structures 110.

In some configurations, all elements 223 in a particular data structure 110 correspond to the same type of entity, e.g., all elements 223 correspond to investors 120 in the system 100. In this configuration, the data storage smart contract 128 may include a first data structure 110 for all investors 120, a second data structure 110 for all custodians 116, a third data structure 110 for all broker dealers 118, and/or a fourth data structure 110 for all security tokens 102 in the system 100. Alternatively, a particular data structure 110 may include elements 223 corresponding to different types of entities, i.e., investor element(s) 223, custodian element(s) 223, and broker dealer element(s) 223 may be included in a single data structure 110.

Each element 223 may include two storage slots 215A-N where each storage slot is a fixed number of bytes. For example, a storage slot may be 32 bytes long (or any suitable length), e.g., each storage slot 215 may be slot in the Solidity programming language. Although each element 223 is illustrated in FIG. 2A as including two storage slots 215 (i.e., N=2M), an element 223 may include only a single storage slot 215 (i.e., N=M) or more than two storage slots 215 (i.e., N>2M).

Each storage slot 215 may include a key 219A-N and a value 221A-N, i.e., a key/value pair. Each key 219 may be a nested structure with a first level indicating the type of entity the element 223 corresponds to (e.g., custodian 116, broker dealer 118, investor 120, etc.) and a second level that indicates an address (e.g., Ethereum address) owned by the particular entity. In this way, the key 215 may be encoded (with the type of entity). Instead of indexing by address, the second level of the key 219 may be indexed in other ways, e.g., a hash of the entity/investor/security token name, etc. Optionally, the keys 219 may include more than two levels. If the element 223 includes two slots 215, the key 219 in the first storage slot 215 of the element 223 may be the same or different than the key 219 in the second slot 215 of the element 223.

The information included in the values 221 may vary depending on the type of entity the element 223 corresponds to. Each value 221 in the data structure 110 may be a nested structure with a first level indicating the type of entity the element 223 corresponds to (e.g., custodian 116, broker dealer 118, investor 120, etc.) and one or more additional levels indicating additional information. In this way, the value 221 may be encoded (with the type of entity) so that a computing device (e.g., a network node 140) will know how to interpret the data in the value 221. In other words, a computing device (e.g., a network node 140) will interpret the data in the value 221 differently based on the encoding, i.e., the type indicated in the value 221. Multiple parameters may be bit-shifted (and/or concatenated) so they fit in the same value 221.

For example, the value 221 in a first storage slot 215 in a particular investor element 223 may include one or more bits indicating "investor" in the first level and the PII hash for the investor 120 in the second level. Furthermore, the value 221 in the second storage slot 215 in the investor element 223 may include (1) one or more bits indicating "investor" in the first level; (2) one or more bits indicating date of accreditation (and/or expiration date of accreditation) in a second level, i.e., the date that a determination was made that the investor 120 qualifies under one or more exemptions to the SEC Regulations; (3) one or more bits indicating whether a freeze has been placed on the investor 120 in a third level, e.g., a single bit (e.g., isFrozen flag); (4) an address (e.g., Ethereum address) of the investor's broker dealer 118 in a fourth level; and/or (5) the investor 120 country of origin in a fifth level. Optionally, the second value 221 in a particular investor element 223 may include other parameters, e.g., (1) whether the investor 120 qualifies under SEC Regulation A; (2) whether the investor 120 qualifies under SEC Regulation D; (3) whether the investor 120 qualifies under SEC Regulation S; (4) whether AML/KYC been performed by the broker dealer 118; and/or (6) a length of time a particular security token 102 has been owned by the investor 120.

Examples of other data structures 110 include custodian elements 223, broker dealer elements 223, and/or optional security token elements 223. Each custodian element 223 may include attribute(s) about a particular custodian 116. The value(s) 221 in a particular custodian element 223 may include one or more bits indicating "custodian" in the first level and one or more bits indicating whether a freeze has been placed on the custodian 116 in a second level, e.g., a single bit (e.g., isFrozen flag). Optionally, a custodian element 223 may reference an address (e.g., Ethereum address) of one or more investor elements 223, broker dealer elements 223, and/or security token elements 223 that the custodian element 223 is associated with. For example, a custodian element 223 may include an address (e.g., Ethereum address) of one or more broker dealers 118 that the custodian 116 is associated with.

Each broker dealer element 223 may include attribute(s) about a particular broker dealer 118. The value(s) 221 in a particular broker dealer element 223 may include one or more bits indicating "broker dealer" in the first level and one or more bits indicating whether a freeze has been placed on the broker dealer 118 in a second level, e.g., a single bit (e.g., isFrozen flag). Optionally, a broker dealer element 223 may reference an address (e.g., Ethereum address) of one or more investor elements 223, custodian element 223, and/or security token elements 223 that the broker dealer element 223 is associated with. For example, a broker dealer element 223 may include an address (e.g., Ethereum address) of one or more custodians 116 that the broker dealer 118 is associated with.

Each security token element 223 may include attribute(s) about a particular security token 102. The value(s) 221 in an optional security token element 223 may include one or more bits indicating "security token" in the first level and one or more bits indicating whether a freeze has been placed on the security token 102 in a second level, e.g., a single bit (e.g., isFrozen flag). Various other information about the security token 102 may be included in the value(s) a security token element 223.

Each optional issuer element 223 may include attribute(s) about a particular issuer 114. The value(s) 221 in a particular optional issuer element 223 may include one or more bits indicating "issuer" in the first level and one or more bits indicating whether a freeze has been placed on the issuer 114 in a second level, e.g., a single bit (e.g., isFrozen flag). Optionally, an issuer element 223 may reference addresses (e.g., Ethereum addresses) of one or more investors 120, custodians 116, broker dealers 118 and/or security token 102 that the issuer 114 is associated with.

Figure 2B:
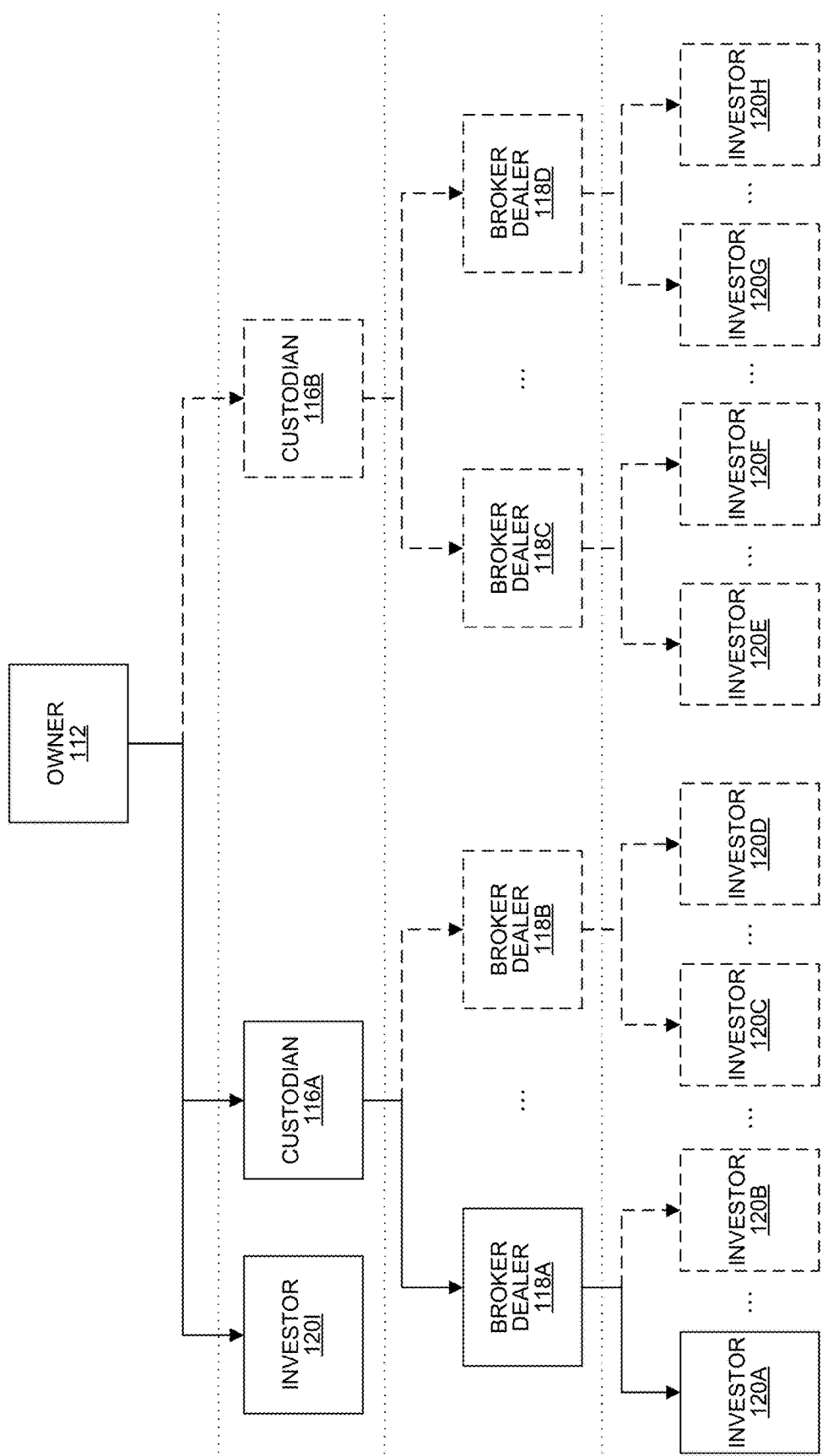
FIG. 2B is a block diagram illustrating a hierarchy of entities in the systems illustrated in FIGS. 1A-1B.

FIG. 2B is a block diagram illustrating a hierarchy of entities in the system 100 illustrated in FIG. 1. Specifically, FIG. 2B shows relationships between one or more investors 120, optional one or more broker dealers 118, optional one or more custodians 116, and/or one or more owners 112 of the system 100.

In examples, the hierarchy in FIG. 2B may define data permissions in the system 100. The hierarchy may be stored in any suitable form and/or may be implicit in the data stored in various elements 223.

When a security token 102 transaction is requested, the compliance rule pointer 107 in the security token 102 may point to at least one compliance rule 106 (e.g., smart contract(s)) that references an investor element 223 associated with the buyer and/or seller of the security token 102. Optionally, this may include the at least one compliance rule 106 passing an address (e.g., an Ethereum address that identifies an investor element 223) to the global registry 108. In examples, the at least one compliance rule 106 may perform one or more of the following actions: (1) ensure that the buyer and/or seller qualify under at least SEC Regulation A, D, or S; (2) ensure that AML/KYC has been performed for the buyer and/or seller in the security token 102 transaction; (3) ensure that the particular security token 102 is not in a blackout period (e.g., based on the length of time a particular security token 102 has been owned by the seller); and/or (4) ensure that no freezes have been placed on the buyer or seller.

A freeze may be placed on (or removed from) an investor 120 by changing data (e.g., a portion of a value 221) in a particular investor element 223 associated with the investor 120. Placing or removing a freeze on an investor 120 may require permissions based on the hierarchy in FIG. 2B. A custodian 116 may also place a freeze on an investor 120. In examples, a custodian 116A may have permission to place a freeze on investors 120A-D (for whom it holds security tokens 102) by changing data (e.g., a portion of a value 221) in the investor's 120A-D investor elements 223, i.e., since the custodian's 116A is associated with the investors 120A-D in the hierarchy. In contrast, a custodian 116B that is not associated with the investors 120A-D may preferably not have permission to place a freeze on the investors 120A-D since the custodian 116B is not associated with the investors 120A-D in the hierarchy. Optionally, a broker dealer 118A may have permission to place a freeze on its customer investors 120A-B, but may preferably not have permission to place a freeze on the investor 120A since the broker dealer 118 is not associated with investor 120A.

Optionally, an owner 112 of the system 100 may have permission to place a freeze on an investor 120 without regard to any hierarchy in FIG. 2B, e.g., in response to a court order when fraud is suspected. In some examples, if an investor 120I is an external investor that is not a customer of any broker dealer 118 or custodian 116, the owner 112 (or issuer 114) alone may have permission to place a freeze on the investor 120I.

Alternatively, instead of the at least one compliance rule 106 referencing an investor element 223 in the data storage smart contract 128, the at least one compliance rule 106 may directly store one or more attributes relevant to SEC Regulation compliance. In examples, there may be a separate compliance rule 106 for every investor 120 that directly indicates whether the investor 120 qualifies under SEC Regulation A, D, or S; whether AML/KYC has been performed; whether the particular security token 102 is in a blackout period; and/or whether a freeze has been placed on the investor 120. In this configuration, the compliance rules 106 may be updated when information relevant to SEC Regulations changes (instead of, or in addition to, changing the investor element(s) 223).

In one configuration, when an investor 120 has a freeze placed on them, the investor 120 may not participate in any security token 102 transactions as a buyer or a seller, i.e., security tokens 102 held by (or on behalf of) the investor 120 may be frozen (temporarily not transferrable). In an alternative configuration, a freeze on an investor 120 may only prevent the investor 120 from participating in security token 102 transactions involving certain broker dealer(s) 118 and/or custodian(s) 116 that placed the freeze, i.e., security tokens 102 held, by the freeze-placing custodian 116 or broker dealer 118, on behalf of the investor 120 may be frozen (temporarily not transferrable). In examples, if a particular investor 120 has a freeze placed on them by a first custodian 116 or broker dealer 118, but not a second custodian 116 or broker dealer 118, the investor 120 may be prevented from participating in transactions via the first custodian 116 or broker dealer 118, but not the second custodian 116 or broker dealer 118. In that case, the first custodian 116 or broker dealer 118 is not liable for regulatory determinations (or lack thereof) of the second custodian 116 or broker dealer 118 and vice versa. Additionally, this prevents the first broker dealer 118 from tampering with an investor element 223 created and maintained by the second broker dealer 118 and vice versa.

A data structure 110 may store multiple investor elements 223 for an investor 120 that has accounts at multiple broker dealers 118. In examples, a first investor element 223A may describe a particular investor 120, according to data collected by a first broker dealer 118A, e.g., during onboarding performed by the first broker dealer 118A. Similarly, a different investor element 223B may describe the same particular investor 120, according to data collected by a different broker dealer 118B, e.g., during onboarding performed by the different broker dealer 118B. Additionally or alternatively, an investor element 120I may be stored for an external investor that is not a customer of a broker dealer 118 or custodian 116.

When a security token 102 transaction is requested, in addition to referencing an investor element 223 associated with the buyer and/or seller, the at least one compliance rule 106 (e.g., smart contract(s)) may reference one or more custodian elements 223 and/or one or more broker dealer elements 223 associated with the buyer and/or seller of the security token 102 (and optionally a security token element 223 associated with the security token 102). Optionally, this may include the at least one compliance rule 106 passing an address(es) (that identify the custodian element(s) 223, the broker dealer element(s) 223, and/or security token element 223) to the global registry 108. In examples, in addition to the various checks based on the investor element(s) 223, the at least one compliance rule 106 may ensure that no freezes have been placed on the custodian(s) 116, broker dealer(s) 118, and/or security token 102 associated with the security token 102 transaction.

A freeze may be placed on (or removed from) a custodian 116 or a broker dealer 118 by changing data (e.g., a portion of a value 221) in a particular custodian element 223 or broker dealer element 223 associated with the custodian 116 or broker dealer 118, respectively. Placing or removing a freeze on a custodian 116 or broker dealer 118 may require permissions based on the hierarchy in FIG. 2B. In examples, a custodian 116 associated with a broker dealer 118 may have permission to place a freeze on the broker dealer 118. In contrast, a custodian 116 not associated with a broker dealer 118 may preferably not have permission to place a freeze on the broker dealer 118. Optionally, an owner 112 may have permission to place a freeze on a custodian 116 or broker dealer 118 without regard to the hierarchy in FIG. 2B, e.g., in response to a court order when fraud is suspected.

When a freeze is placed on a custodian 116, security tokens 102 held by the custodian 116 may be frozen (temporarily not transferrable). Similarly, when a freeze is placed on a broker dealer 118, security tokens 102 held by (or on behalf of) the broker dealer 118 may be frozen (temporarily not transferrable).

A freeze may be placed on (or removed from) a security token 102 by changing data (e.g., a portion of a value 221) in a particular security token element 223. In examples, placing or removing a freeze on a security token may be performed only by an owner 112 of the system 100, e.g., if fraud is suspected or if the security token 102 is suspected of sponsoring terrorism. Without limitation, an owner 112 may place or remove a freeze on a security token 102 in response to a court order. When a freeze is placed on a security token 102, all outstanding security tokens 102 (for that token type) may be frozen (temporarily not transferrable).

Optionally, a freeze may be placed on an issuer 114 or a security token exchange 124 by changing data (e.g., a portion of a value 221) in a particular issuer element 223 or security token exchange element 223, respectively. In examples, placing or removing a freeze on an issuer 114 or a security token exchange 124 may be performed only by an owner 112 of the system 100, e.g., if fraud is suspected or if an issuer 114 or security token exchange 124 is suspected of sponsoring terrorism. Without limitation, an owner 112 may place or remove a freeze on a security token 102 in response to a court order. When a freeze is placed on an issuer 114, all outstanding security tokens 102 (issued/deployed by or on behalf of the issuer 114) may be frozen (temporarily not transferrable). When a freeze is placed on a security token exchange 124, no security token 102 transactions may be executed on the security token exchange 124.

Alternatively, instead of the at least one compliance rule 106 referencing a custodian element 223, a broker dealer element 223, and/or security token element 223 in the data storage smart contract 128, the at least one compliance rule 106 may directly store some of the attributes. In examples, there may be a separate compliance rule 106 for every custodian 116, broker dealer 118, and security token 102 that directly states whether a freeze has been placed on the custodian 116, broker dealer 118, or security token 102, respectively. In this configuration, the compliance rules 106 may be updated when freezes has been placed on a custodian 116, broker dealer 118, or security token 102 (instead of, or in addition to, changing the custodian element 223, broker dealer element 223, and security token element 223 in the data storage smart contract 128).

The smart contracts 128-134 implementing the global registry 108 may be executed by a virtual machine (e.g., the Ethereum Virtual Machine) running on a network node 140. Each entity in the system 100 may have different data permissions (other than freeze indications) to the data storage smart contract 128. In examples, the owner 112 may own the at least one smart contracts 128-134 in the global registry 108 and/or the at least one compliance rule 106. The owner 112 may be able to call one or more of the following methods (e.g., in the custodian smart contract 130) to modify the data storage smart contract 128: setComplianceAddress( ) that sets an address (e.g., an Ethereum address) of the compliance rules 106, i.e., sets the compliance rule pointer 107; setRegistryAddress( ) that, for example, links an address of a smart contract, e.g., one of the smart contracts 128-134 implementing the global registry 108; setIssuer( ) that sets an address (e.g., an Ethereum address) of the owner 112 (or issuer 114) of a security token 102 in the system 100; addCustodian( ) that adds an address (e.g., an Ethereum address) of a new custodian 116 to the data storage smart contract 128; and removeCustodian( )

that removes an address (e.g., an Ethereum address) of an existing custodian 116 from the data storage smart contract 128.

An owner 112 (or optionally issuer 114) may be able to call one or more of the following methods (e.g., in the security token 102 or the originating smart contract 113): issue( ) that issues security tokens 102; cancelAndReissue( ) that replaces lost security tokens 102; and allowPeerToPeer( ) that toggles peer-to-peer functionality. Optionally, an issuer 114 (or owner 112) may call a method (e.g., freezeCustodian( ) that sets an isFrozen flag in a custodian element 223. Optionally, an owner 112 may call a method (e.g., freezeInvestor( ) that sets an isFrozen flag in an investor element 223.

A custodian 116 may be able to call, directly or indirectly via an optional interface smart contract, one or more of the following methods (e.g., in the broker dealer smart contract 132) to modify the data storage smart contract 128: addBrokerDealer( ) that adds an address (e.g., an Ethereum address) managed by a broker dealer 118; removeBrokerDealer( ) that removes an address (e.g., an Ethereum address) managed by a broker dealer 118; and setBrokerDealerAccounts( ) that adds addresses (e.g., Ethereum addresses) of broker dealer 118 and account numbers assigned to broker dealers 118 by the custodian 116, e.g., a list of addresses. Optionally, a custodian 116 may call a method (e.g., freezeBrokerDealer( ) that sets an isFrozen flag in a broker dealer element 223 that the custodian is associated with. Optionally, a custodian 116 may call a method (e.g., freezeInvestor( ) that sets an isFrozen flag in an investor element 223 that the custodian 116 is associated with.

A broker dealer 118 may be able to call, directly or indirectly via an optional interface smart contract, one or more of the following methods (e.g., in the investor smart contract 134) to modify the data storage smart contract 128: addVerified( ) that adds an investor element 223 to the data storage smart contract 128; remove Verified( ) that removes an investor element 223 from the data storage smart contract 128; and update Verified( ) that updates the PII hash in an investor element 223 in the data storage smart contract 128. Optionally, a broker dealer 118 may call a method (e.g., freezeInvestor( ) that sets an isFrozen flag in an investor element 223 that the broker dealer 118 is associated with.

An investor 120 may be able to call the following method (e.g., in the security token 102 or the originating smart contract 113): transfer( ) function 109 that transfers funds and/or security tokens 102 between two addresses. to the investor's 120 broker dealer 118 address held at the custodian 116 (even if peer to peer security token 102 transactions are enabled in the security token 102).

Additionally, the transfer function 109 may reference different compliance rule(s) 106 depending on the types of entities involved in the security token 102 transaction. For example, for security token 102 transactions not involving investors 120, the transfer function 109 may reference few or no compliance rules 106. In contrast, for security token 102 transactions involving investors 120, the transfer function 109 may reference more compliance rules 106 than security token 102 transactions not involving investors 120. Furthermore, for transactions for different security tokens 102, the transfer function 109 may reference different compliance rules 106 that may or may not overlap. For example, the transfer function 109 may reference one or more first compliance rule(s) 106 relating to the exemptions to SEC Regulations A, D, and/or S for transactions of a first security token 102, but only one or more second compliance rule(s) 106 relating to AML/KYC for transactions of a second security token 102.

Figure 3:
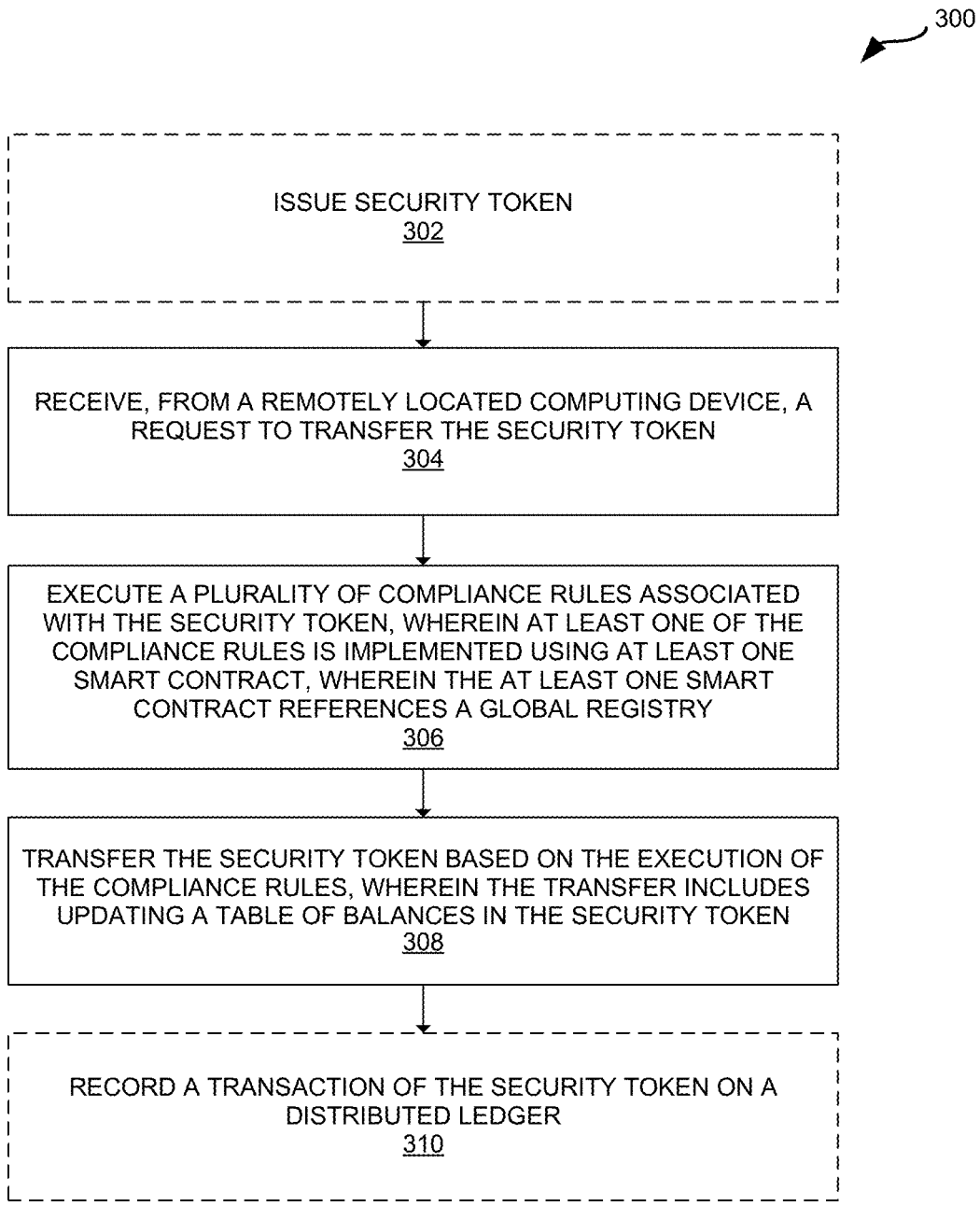
FIG. 3 is a flow diagram illustrating a method for transferring a self-enforcing security token.

FIG. 3 is a flow diagram illustrating a method 300 for transferring a self-enforcing security token 102. The security token 102 is self-enforcing because it automatically complies with one or more exemptions to the SEC regulations, e.g., SEC Regulation A, D, and/or S. The method 300 may be performed by devices in the system 100 including, but not limited to, a network node 140.

Optionally, a security token 102 may be issued 302, e.g., in a security token offering (STO) that deploys many (e.g., hundreds, thousands, or millions of) security tokens 102. The STO may be performed in response the owner 112 (or issuer 114) calling a method (e.g., in the originating smart contract 113) that is executed by a virtual machine (e.g., the Ethereum Virtual Machine (EVM)) running on a network node 140 that stores a copy of the distributed ledger 122. The security tokens 102 deployed during the STO may be allocated to a single wallet (e.g., belonging to the issuer 114 or owner 112) before being allocated to individual investor 120 wallets. Alternatively, the security tokens 102 deployed during the STO may be allocated directly to individual investor 120 wallets. The STO may be performed according to an originating smart contract 113 associated with a particular type of security tokens 102. The originating smart contract 113 may be owned by the owner 112.

A record of the issuance of the security token 102 may optionally be committed to the distributed ledger 122. This record may include one or more input transaction addresses, one or more output transaction address, and/or a quantity of security tokens 102 being issued.

At least one processor in the network node 140 may be configured to receive 304 a request to execute a security token 102 transaction, i.e., a transaction to transfer the security token 102. The request may be received (e.g., at the network node 140) from an investor 120, a broker dealer 118 on behalf of the investor 120, or a custodian 116 on behalf of a broker dealer 118. In any case, the request may be received from a computing device that is remotely located from the network node 140.

The at least one processor in the network node 140 may also be configured to execute 306 a plurality of compliance rules 106 associated with the security token 102. At least one of the compliance rules 106 may be implemented with one or more smart contracts that references the global registry 108. The compliance rules 106 may be referenced by a compliance rule pointer 107 stored in the security token 102. Alternatively, the compliance rules 106 may be stored in the security token 102. The execution of the compliance rules 106 is described in FIG. 4.

The at least one processor in the network node 140 may also be configured to transfer 308 the security token 102 based on the execution of the compliance rules 106. In examples, the security token 102 may be transferred only if (1) the buyer and/or the seller of the security token 102 qualify under at least one of SEC Regulations A, D, and S; (2) AML and/or KYC services have been performed for the buyer and/or seller; (3) no freezes have been placed (discussed below) that would prevent the security token 102 from being transferred; and/or (4) the security token 102 is not in a blackout period. Otherwise, the security token 102 may not be transferred, and optionally, the requesting investor 120 may be notified. In examples, the transfer may include updating the table of balances 105 in the security token 102.

Optionally, the at least one processor in the network node 140 may also be configured to record 310 a transaction of the security token 102 on a distributed ledger 122, e.g., a security token 102 transaction may be committed to the distributed ledger 122. When committed to the distributed ledger 122, one or more input transaction addresses belonging to the seller, one or more output transaction address belonging to the buyer, and/or a quantity of security tokens 102 being transferred may be committed to the distributed ledger 122.

Figure 4:
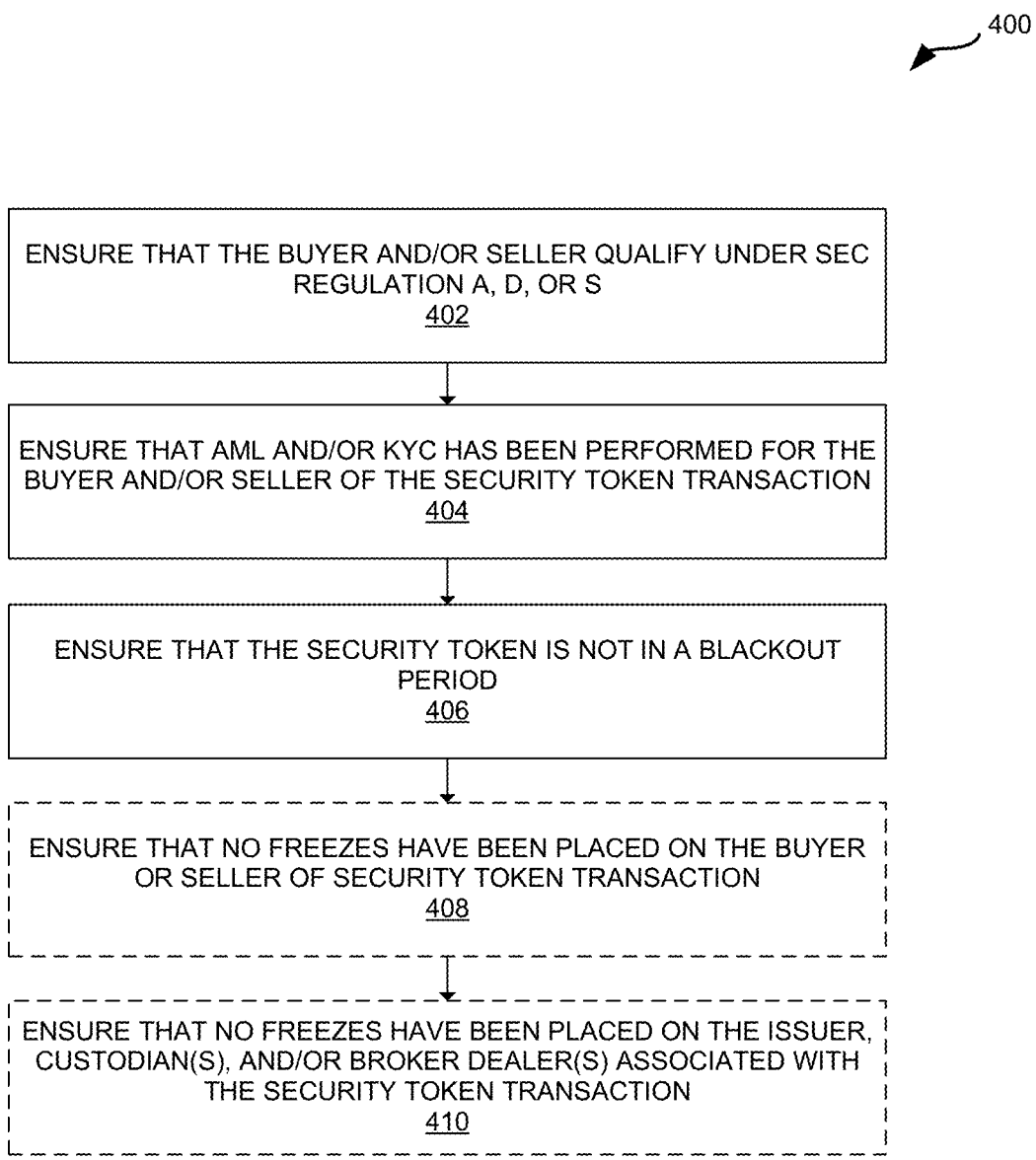
FIG. 4 is a flow diagram illustrating a method for executing at least one compliance rule.

FIG. 4 is a flow diagram illustrating a method 400 for executing at least one compliance rule 106. The at least one compliance rule 106 may be implemented using at least one smart contract (or referenced by a compliance rule pointer 107) in the security token 102. The at least one compliance rule 106 may be executed by at least one processor running a virtual machine, e.g., at least one processor in a network node 140.

The at least one compliance rule 106 may reference the data storage smart contract 128, e.g., the at least one compliance rule 106 may reference an investor element 223 associated with the buyer and/or seller of the security token 102. Optionally, the at least one compliance rule may also reference a custodian element 223, a broker dealer element 223, and/or a security token element 223 relevant to the security token 102 transaction.

The at least one processor in the network node 140 may ensure 402 that the buyer and/or seller qualify under at least SEC Regulation A, D, or S. This may include deriving a qualification (under an exemptions to the SEC Regulations) based on one or more of the following attributes in an investor element 223: customer name; tax identification number (e.g., Social Security number); address; telephone number; date of birth; driver's license, passport information or information from other government-issued identification; employment status and occupation; whether the customer is employed by a brokerage firm; annual income; net worth; and/or account investment objectives. Each broker dealer 118 may be responsible (and have permissions) for updating attributes in investor elements 223 associated with its customer investors 120. Additionally or alternatively, the investor 120 may be responsible for creating, updating, and/or removing the attributes in the investor element 223 associated with itself, e.g., if an investor 120 is an external investor.

The at least one processor in the network node 140 may also ensure 404 that AML and/or KYC has been performed for the buyer and/or seller of the security token 102 transaction, e.g., AML alone, KYC alone, or AML and KYC. The AML and/or KYC determination may be made by an identity services provider 126 based on information received at a broker dealer 118, e.g., including PII collected during onboarding. Once the AML and/or KYC determination is made by the identify services provider 126 and sent to the broker dealer 118, the broker dealer 118 may store an indication of the AML and/or KYC determination in the global registry 108, e.g., as an attribute in an investor element 223 in a data structure 110 stored in the data storage smart contract 128. Alternatively, the mere presence of an investor element 223 in a data structure 110 may indicate that AML and/or KYC was successfully performed without any flags that would prevent the investor 120 from participating in security token 102 transactions, i.e., the investor element 223 may only be created in the data structure 110 in response to AML and/or KYC being successfully performed without any flags that would prevent the investor 120 from participating in security token 102 transactions.

The at least one processor in the network node 140 may also ensure 406 that the particular security token 102 is not in a blackout period (e.g., based on the length of time a particular security token 102 has been owned by the seller). This may include referencing information relevant to a security token 102 transaction that is not included in the global registry 108. In examples, the at least one compliance rule 106 may traverse previous security token 102 transactions in the distributed ledger 122 to find the most recent transaction of the security token 102 involved in the current security token 102 transaction. The date of the most recent transaction may then be compared to the current date (e.g., by accessing a server's date) to determine the length of time that the seller has held the security token 102. The length of time may be used to determine whether the security token 102 is in a blackout period. In examples, when the length of time is greater than the blackout period length, the security token 102 is not in a blackout period, and the security token 102 transaction may be executed. However, when the length of time is less than or equal to the blackout period length, the security token 102 is in a blackout period, and the security token 102 transaction may preferably not be executed.

Optionally, the at least one processor in the network node 140 may also ensure 408 that no freezes have been placed on the buying or selling investor 120. A freeze may be placed on (or removed from) an investor 120 by changing data (e.g., a portion of a value 221) in a particular investor element 223 associated with the investor 120. When an investor 120 has a freeze placed on them, security tokens 102 held by (or on behalf of) the investor 120 may be frozen (temporarily not transferrable). In an alternative configuration, only security tokens 102 held by the freeze-placing custodian 116 or broker dealer 118 (on behalf of the investor 120) may be frozen (temporarily not transferrable). A freeze may be placed on an investor 120 by a broker dealer 118 that the investor 120 has an account with, or a custodian 116 that investor's broker dealer 118 has an account with. An owner 112 may also place a freeze on an investor 120. A freeze may be placed on an investor 120, e.g., in response to a court order when fraud is suspected.

Optionally, the at least one processor in the network node 140 may also ensure 410 that no freezes have been placed on the custodian(s) 116, broker dealer(s) 118, and/or security token 102 associated with the security token 102 transaction. A freeze may be placed on (or removed from) a security token 102 by changing data (e.g., a portion of a value 221) in a particular security token element 223. In examples, placing or removing a freeze on a security token 102 may be performed only by an owner 112 of the system 100, e.g., if fraud is suspected or if security token 102 is suspected of sponsoring terrorism. The owner 112 may place or remove a freeze on a security token 102 in response to a court order. When a freeze is placed, outstanding security tokens 102 (of the particular type that is frozen) may be frozen (temporarily not transferrable).

When a freeze is placed on a custodian 116, security tokens 102 held by the custodian 116 may be frozen (temporarily not transferrable). Similarly, when a freeze is placed on a broker dealer 118, security tokens 102 held by (or on behalf of) the broker dealer 118 may be frozen (temporarily not transferrable).

Figure 5:
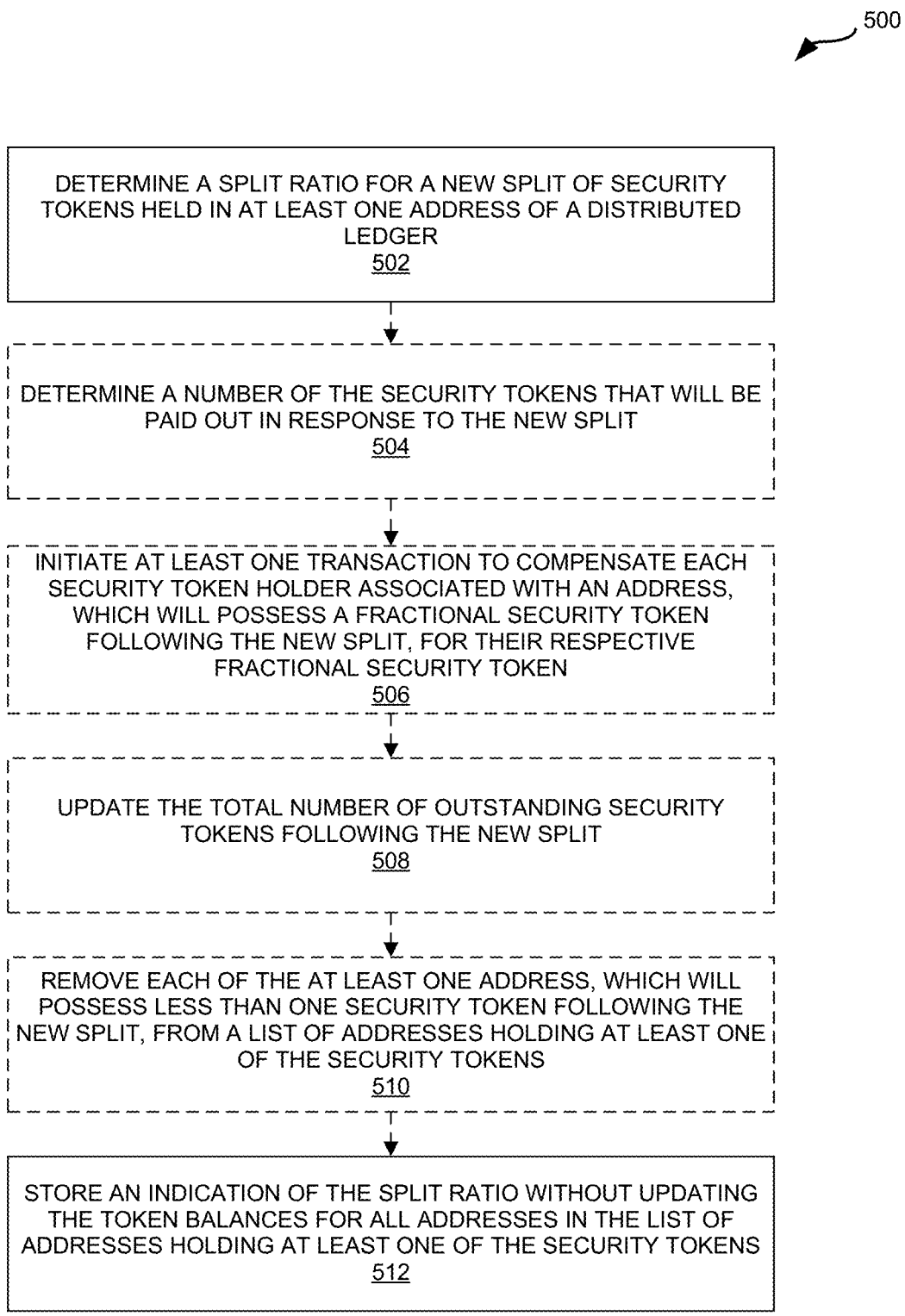
FIG. 5 is a flow diagram illustrating a method for token splitting without formally updating token balances.

FIG. 5 is a flow diagram illustrating a method 500 for token splitting without formally updating token balances. The method 500 may be executed by at least one processor running a virtual machine in the system 100, e.g., at least one processor in a network node 140. The method 500 may include executing one or more split-related methods 152 implemented in a security token 102, e.g., stored in a distributed ledger 122. Additionally, the method 500 may utilize one or more split-related parameters 154 in a security token 102, e.g., stored in a distributed ledger 122. The method 500 may incur low (or no) blockchain-related fees (gas).

The method 500 may begin at step 502 where the at least one processor determines a split ratio for a new split of security tokens 102 held in at least one address of a distributed ledger 122, e.g., an Ethereum blockchain. This may include an issuer 114 (or owner 112) setting a numerator and a denominator, which together form the split ratio. The new split may be a forward split or a reverse split. For example, a numerator of 2 with a denominator of 1 (considered a forward split since numerator>denominator) means that the number of existing security tokens 102 (of the specified type) is meant to double after the new split, with each resulting security token 102 having half the value compared to before the split. As another example, a numerator of 1 with a denominator of 2 (considered a reverse split since numerator<denominator) means that the number of existing security tokens (of the specified type) is meant to half after the new split, with each resulting security token having twice the value compared to before the split.

As discussed above, the issuer 114 may be a company (or a computing device owned and/or controlled by the company) that issues security tokens 102, each representing a share of the company. The split ratio may be determined by the company (e.g., the board of directors of the company) when deciding to initiate a split on security tokens 102 representing the company's shares. In some configurations, the issuer 114 may call the update split method 142 (implemented in the security token 102) and pass the split ratio as one of the parameters. For example, the issuer may invoke the following function call: updateSplit (numerator, denominator).

The method 500 may proceed at optional step 504 where the at least one processor determines a number of the security tokens that will be paid out in response to the new split. Specifically, the system 100 may not allow for fractional shares. Therefore, token holders will be paid out for their resulting fractional tokens (e.g., half tokens) following a split. This is referred to as "burning" these fractional tokens 102, which reduces the total number of outstanding security tokens (of the specified type). The number of tokens that will be paid out/burned is referred to as cashedOutTokenQuantity, and may be stored as a split-related parameter 154 in the security token 102. Fractional tokens typically result from reverse splits (where the total number of tokens/shares is reduced, each resulting share having a proportionally greater value post-split), but can also result from a "forward" split with a non-integer (e.g., 3/2) split ratio.

Optional step 504 may include an audit of a list of addresses holding token(s) (e.g., in a table of balances 105 stored in the security token 102) to determine how many security tokens 102 will be burned. In examples, the at least one processor may iteratively step through all addresses in the list of addresses and, for each address, determine the fractional (non-integer) tokens in the resulting post-split token balance associated with the address. The fractions of tokens identified across all addresses in the list of addresses may be summed together to determine the number of security tokens 102 that will be paid out/burned (cashedOutTokenQuantity).

As a simple example of the audit in optional step 504, suppose that there are three token holders: A, B, and C of a particular token 102. If the split ratio of a new split is 1/2, A's address possessing 100 pre-split tokens 102 will have 50 split-updated tokens (with no fractional tokens), B's address possessing 75 pre-split tokens 102 will have 37 1/2 post-split tokens (i.e., 1/2 fractional tokens), and C's address possessing 55 pre-split tokens 102 will have 27 1/2 post-split tokens (i.e., 1/2 fractional tokens). The amount of all fractional tokens to be paid out/burned (cashedOutTokenQuantity) following the new split will be 1 token (1/2 from B and 1/2 from C). In examples, the split-updated token balance for each address may be determined by calling the balance check method 144, passing a different address in each invocation of the balance check method 144.

The method 500 may proceed at optional step 506 where the at least one processor initiates at least one transaction to compensate each security token holder, which will possess a fractional security token following the new split, for their respective fractional security token 102. The transaction may be a cryptocurrency transaction that is recorded on the distributed ledger 122. For example, a cryptocurrency transaction may be initiated for each fraction token holder, where the fractional token holder's address is the output address of a transaction, and where the amount of cryptocurrency transferred has a value equal (or very nearly equal to) their fractional token being paid out/burned in response to the new split. The issuer 114 may be the payor in these transaction(s), so the issuer's address may be the input address in the transaction(s). In some configurations, more than one of the (e.g., all) fractional token holders may be compensated for their respective fractional token in a single transaction, e.g., the issuer's address is the input address, and all the addresses of the fractional token holders are the output addresses.

In some configurations, optional step 506 may include the at least one processor updating the token balances (e.g., in the table of balances 105) for the address(es) that will have fractional tokens paid out/burned following the new split. This may include calling the update balances method 146 (updateBalances( )). For example, all addresses with a fractional token balance of less than one (following the new split) may have their balances updated. Alternatively, all addresses with a fractional token balance following the new split may have their balances updated. Alternatively, none of the addresses have their token balances updated following the new split (unless a subsequent transfer is initiated). In some configurations, paying out/burning tokens may include invoking the transfer( ) method 109.

The method 500 may proceed at optional step 508 where the at least one processor updates the total number of outstanding security tokens 102 following the new split. The post-split total number of outstanding security tokens may be determined as the pre-split total number of outstanding security tokens minus the number tokens paid out/burned in response to the new split (cashedOutTokenQuantity). Accordingly, optional step 508 may include the at least one processor calling an update total tokens (splitTotalSupply( )) method 148, which takes cashedOutTokenQuantity as a parameter.

The method 500 may proceed at optional step 510 where the at least one processor removes each security token holder, which will possess less than one security token 102 following the new split, from a list of addresses holding at least one of the security tokens 102, e.g., in a table of balances 105 stored in the security token 102. In other words, the address(es) of token holder(s) that will no longer possess any tokens (after the fractional tokens are paid out in response to the new split) will no longer be considered token holders (of the specified type of security token 102) following the new split.

Optional step 510 may include the at least one processor calling a remove shareholder function 150, e.g., implemented in the security token 102. A single address (of a token holder possessing less than one security token 102 following the new split) may be passed as a parameter to each invocation of the remove shareholder function 150. Alternatively, multiple addresses of at least one token holder may be passed to a single invocation of the remove shareholder function 150.

The method may proceed at step 512 where an indication of the split ratio is stored without updating the token balances for all addresses in the list of addresses holding at least one of the security tokens (e.g., the table of balances 105). The stored split ratio may be used to determine split-updated token balances, e.g., as part of a subsequent token transfer described in FIG. 6. Performing the method 500 without actually changing the token balances for all addresses in the list of addresses holding at least one of the security tokens (e.g., the table of balances 105 in the security token 102) may reduce blockchain-related fees (gas) incurred when a token is split.

It should be noted that the method 500 may be performed each time a split is initiated on the security token 102. A history of splits may be stored in a single data structure (e.g., in an array called splits [ ] having an object for each split, each object having a numerator and a denominator of a particular split).

Figure 6:
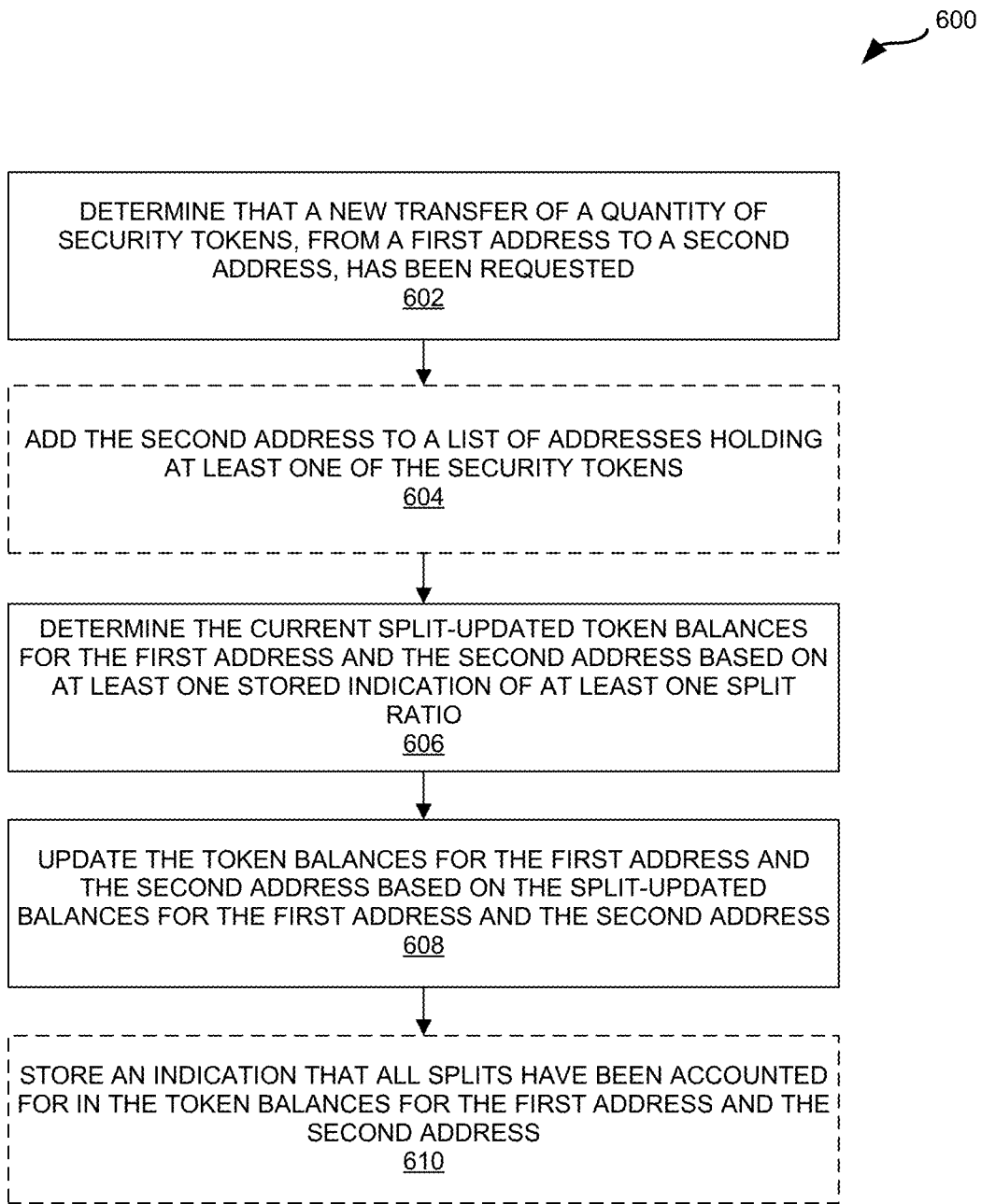
FIG. 6 is a flow diagram illustrating a method for transferring a security token following a token split.

FIG. 6 is a flow diagram illustrating a method 600 for transferring at least one security token 102 following a token split. The method 600 may be executed by at least one processor running a virtual machine in the system 100, e.g., at least one processor in a network node 140. The method 600 may include executing one or more split-related methods 152 implemented in a security token 102, e.g., stored in a distributed ledger 122. Additionally, the method 600 may utilize one or more split-related parameters 154 in a security token 102, e.g., stored in a distributed ledger 122.

The method 600 of FIG. 6 may be performed after one or more iterations of the method 500 of FIG. 5. In examples, if a particular token holder holds a quantity of tokens for a long period of time (across multiple splits of the security token 102), the method 600 may have to account for multiple splits (e.g., according to the method 500 of FIG. 5) as part of the transfer of the at least one security token 102. Alternatively, if the particular token holders involved in the transfer have not yet acquired tokens or only recently acquired tokens (and no intervening splits have been declared for the security token 102), the method 600 may not have to account for any splits (e.g., according to the method 500 of FIG. 5).

As noted above, the token balances in the list of addresses (e.g., in the table of balances 105) may not actually be updated when a token is split (e.g., according to the method 500 of FIG. 5). Instead, an indicator of the split ratio may be stored, which can be accounted for during future executions of the check balance method 144 and/or the transfer( ) method 109. In contrast, the method 600 of FIG. 6 may actually update the list of addresses (e.g., in the table of balances 105).

The method 600 may begin at step 602 where the at least one processor determines that a new transfer of a quantity of the security tokens 102, from a first address to a second address, has been requested. In examples, step 602 may include a transfer( ) method 109 being called. The transfer( ) method 109 may be implemented in the security token 102 and may be called by a wallet (e.g., implemented on an investor 120 smartphone or in a browser using Metamask) or any other computing device (e.g., a hosted Ethereum provider, such as Infura) or via direct private network node 140 access. In examples, the following parameters may be passed as part of the transfer( ) method 109: the second address (of the transferee token holder) as the output address, and the quantity (of security tokens being transferred). In examples, the at least one processor uses the address invoking the transaction (the first address of the transferring/transferor token holder, in this example) as the input address from which the at least one security token 102 will be transferred, i.e., so the first address does not get sent as an explicit parameter.

The method 600 may proceed at optional step 604 where the at least one processor adds the second address to the list of addresses holding at least one of the security tokens 102 (e.g., in a table of balances 105 in the security token 102). If the second address (received as a parameter in the transfer( ) method 109 call) is already in the list of addresses, optional step 604 may be skipped. If the second address is not already in the list of addresses, it may be added with an initial token balance of 0.

The method 600 may proceed at step 606 where the at least one processor determines split-updated token balances (newBalance) for the first address and the second address based on at least one stored indication of at least one split ratio. Step 606 may include the transfer( ) method 109 calling a update balances method 146 (updateBalances( )), which calls a balance check method 144 (balanceOf( )), all being implemented in the security token 102. In some configurations, the balance check method 144 may be called twice: once for the first address and once for the second address.

During the balance check method 144 for the first address, the at least one processor may iterate through all the splits for which the token balance associated with the first address (of the token transferor) has not been adjusted, but should be. For the first unaccounted-for split, the at least one processor may determine a new token balance as the respective pre-split token balance multiplied by a stored indication of a first split ratio, e.g., newBalance=pre-split balance*1st split ratio. If multiple splits need to be accounted for, the resulting new token balance is then multiplied by the stored indications of all remaining unaccounted-for splits, until all splits have been accounted for, e.g., newBalance=pre-split balance*1st split ratio*2nd split ratio. If all splits have been accounted for (including for new token holders purchasing their first quantity of the security token; or if no splits have been declared for the security token 102 since the first address has held tokens), no adjustments are necessary for the first address and the second address, i.e., newBalance=current token balance.

A similar balance check method 144 may be performed for the second address (to determine the newBalance for the second address). In some configurations, the token balance associated with the first address will be adjusted to account for a different number of splits than the token balance associated with the second address. In other words, the newBalance for the first address may be determined by multiplying the current token balance by a different number of split ratios than the newBalance for the second address. For example, if a first token holder (owning the first address) has held their security tokens 102 for ten years, during which time the token has been split two times, while the second token holder (owning the second address) has held their security tokens 102 for three years, during which time the token has been split once.

The method 600 may proceed at step 608 where the at least one processor updates the token balances for the first address and the second address based on the split-updated balances (e.g., newBalance values) for the first address and the second address. Step 608 may be performed as part of the update balances method 146 (updateBalances( )), e.g., with the first address and the second address as parameters. In some configurations, the update balances method 146 may be called by the transfer( ) method 109 (called in step 602). In examples, the update balances method 146 may update the actual token balances in the list of addresses (e.g., the table of balances 105 in the security token 102). The updated balance for the first address may be determined as the newBalance for the first address (from step 606) minus the quantity of security tokens transferred. The updated balance for the second address may be determined as the newBalance for the second address (from step 606) plus the quantity of security tokens transferred. Step 608 may include committing the transaction of the at least one security token to a blockchain, e.g., an Ethereum blockchain.

The method 600 may proceed at optional step 610 where the at least one processor stores an indication that all splits have been accounted for in the token balances for the first address and the second address. This may prevent the token balances for the first address and/or second address being multiplied by the same split ratio more than once, e.g., in step 606 of future transfers involving the first address and/or second address. In examples, an index (within a data structure of all split ratios for the security token 102) for each of the first address and second address may be updated. However, other tracking mechanisms are possible to ensure that every split ratio is accurately accounted for, if appropriate.

Example Implementations

Figure 7A:
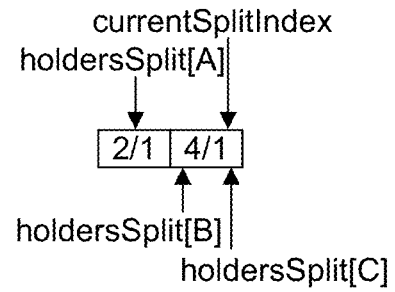
FIG. 7A is a block diagram illustrating a table of balances and a splits data structure before a new token split is declared.
Figure 7B:
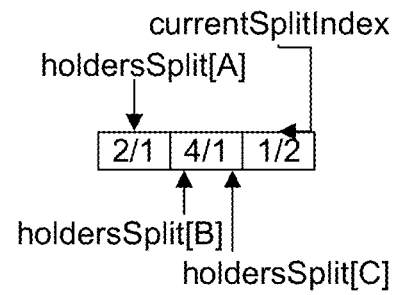
FIG. 7B is a block diagram illustrating a table of balances and a splits data structure after the new token split is declared.
Figure 8A:
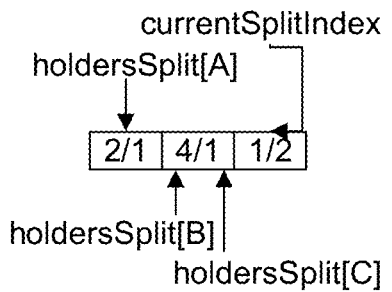
FIG. 8A is a block diagram illustrating a table of balances and a splits data structure before a token transaction is performed.
Figure 8B:
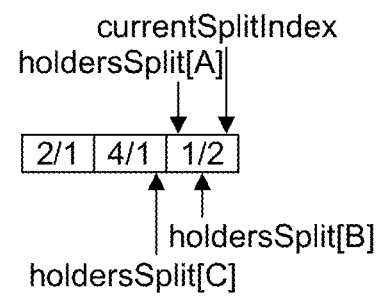
FIG. 8B is a block diagram illustrating a table of balances and a splits data structure after the token transaction is performed.

FIGS. 7A-B are block diagrams illustrating example tables of balances 105 and example multi-object data structure that can be used to implement the token splitting in the method 500 of FIG. 5. FIGS. 8A-B are block diagrams illustrating example tables of balances 105 and example multi-object data structure that can be used to implement the token transfer in the method 600 of FIG. 6. A variety of data structures (e.g., split-related parameters 154) and methods (split-related methods 152) may be implemented in the example implementations described below. However, it is understood that the data structures and methods are merely exemplary and should not be viewed as limiting. The methods in the example implementations may be executed by a processor on a network node 140, e.g., that is running a virtual machine, such as the Ethereum Virtual Machine (EVM).

A multi-object data structure called "splits" is maintained in the example implementations, where the object at each index represents a split ratio of a different split of a particular token 102. In other words, the splits data structure is a mapping of integer indices to split ratios (of splits having occurred in the particular token's history). For example, each object may be of type struct (in Solidity) and may have a numerator element and a denominator element, where numerator/denominator is the split ratio of a particular split. There is only one splits data structure for a particular token that records all splits (forward and reverse through the token's history). The splits data structure for a particular token may be created at the time of creation of the issuing smart contract 113 for the particular token or at issuance of the particular token 102. In examples, the splits data structure is implemented as an array and stored in the security token 102. The splits data structure may be considered a split-related parameter 154 stored on the distributed ledger 122.

A multi-object data structure called "balances" is also maintained in the example implementations. This balances data structure is a mapping where each index is a token holder's address (e.g., "addr") and it points to the token balance in the token holder's address. In other words, the balances data structure may implement the table of balances 105 (e.g., Table 1 above). For example, balances [addr] will return the token balance associated with the address addr. In examples, the balances data structure may be implemented as an array and implemented in the security token 102. The balances data structure may be considered a split-related parameter 154 stored on the distributed ledger 122.

A multi-object data structure called "holdersSplit" is also maintained in the example implementations. The holdersSplit data structure is a mapping where the index is a token holder's address and it points to the index in the splits data structure that has mostly recently been applied to the token balance associated with the token holder's address. For example, a particular shareholder's address (e.g., addr) may be used to find another index (in the splits data structure) of the last split in the token's history that was applied to the token balance for the token holder (e.g., balances [addr]). If a token holder address doesn't exist in holdersSplit, it means that the address has never invoked a transfer to have this updated, and a value of "0" would be returned. The holdersSplit data structure may be considered a split-related parameter 154 stored on the distributed ledger 122.

A single holdersSplit data structure is maintained for a particular token and would be updated after any transfer of the particular token 102. The holdersSplit data structure would have to be updated when (1) a token balance, associated with an address, is updated with a new split during a call of the transfer( ) method 109; and/or (2) a previous token holder is dispossessed of their last remaining quantity of tokens (because a fractional token 102 was paid out and/or the remaining quantity was transferred out of their address). However, if an address (possessing tokens) has never been updated with a new split, the address doesn't need to be added to holdersSplit. The default return value of holdersSplit for an address that doesn't exist in holdersSplit is 0, which indicates that all the possible splits in the token's history need to be adjusted for in the token balance associated with the address.

The holdersSplit data structure for a particular token may be created at the time of creation of the issuing smart contract 113 for the particular token or at issuance of the particular token 102. In examples, the holdersSplit data structure is implemented as an array and stored in the security token 102.

A value called "currentSplitIndex" is also maintained in the example implementations. The value currentSplitIndex is an index (to the splits data structure) of the most recent split/reverse split in the token's history (without respect to any specific token holder). In other words, the value currentSplitIndex tracks the location of the current split in the splits data structure. In examples, the value currentSplitIndex may be implemented as an integer and implemented in the security token 102. The currentSplitIndex value may be considered a split-related parameter 154 stored on the distributed ledger 122.

The update split method 142 (updateSplit( )) is called as part of step 502 in the method 500 of FIG. 5. In the example implementations, the at least one processor executing the update split method 142 (updateSplit( )): (1) adds a new Split object to the splits data structure for the token 102, the Split object having a numerator element and a denominator element; and (2) increments currentSplitIndex. The update split method 142 (updateSplit( )) may be called by the issuer 114 in response to the issuer 114 determining to split tokens 102 issued by a smart contract owned by the issuer 114. The split ratio of the desired split may be passed as a parameter to the update split method 142 (updateSplit( )). The update split method 142 (updateSplit( )) may be a split-related method 152 implemented in the security token 102, and may be executed on a network node 140 implementing the distributed ledger 122.

The balance check method 144 (balanceOf( )) is called as part of optional step 504 in the method 500 of FIG. 5 and/or step 606 in the method 600 of FIG. 6. Alternatively, the balance check method 144 (balanceOf( )) can be called simply to check a split-updated token balance associated with an address (separate from the method 500 of FIG. 5 and the method 600 of FIG. 6). An address of a token holder (e.g., addr) is passed as a parameter to the balance check method 144, e.g., balanceOf(addr). The balance check method 144 (balanceOf(addr)) may be a "view" function, so all blockchain-related fees (gas) may be refunded at the end, making it free to invoke.

During execution of the balance check method 144 (balanceOf(addr)), the at least one processor may iterate through all the Split objects for which the particular address's token balance has not yet been updated, multiplying the token balance (balances [addr]) by the split ratio at each iteration, i.e., the at least one processor may iterate from index holdersSplit [addr]+1 to currentSplitIndex in splits [ ]. The balance check method 144 (balanceOf( )) returns the split-updated balance (newBalance) of the address. In other words, newBalance is determined as balances [addr] multiplied by each split ratio that should be accounted for in the address's token balance, but isn't.

It should be noted that only the split ratios starting at index holdersSplit [addr]+1 (and going to currentSplitIndex) in the splits data structure are used to determine newBalance during execution of the balance check method 144 (balanceOf( )). Accordingly, the split ratio of any split that was declared before the token holder became a token holder is/are not used in the newBalance calculation in the balance check method 144 (balanceOf( )).

The following excerpt of code illustrates the example implementation of the balance check method 144 (balanceOf( )):

function balanceOf(address addr)
public
view
returns (uint256) {
  unit256 newBalance=balances [addr];
  for (uint i=holdersSplit [addr]+1; i<=currentSplitIndex; i++) {newBalance=
  (newBalance.multiply (splits [i].numerator)).divide (splits [i].denominator);}
  return newBalance;
}

As can be deduced from the excerpt of code (and preceding description), the current balance for the token holder (balances [addr]) is obtained and set as newBalance. Each split (in the splits [ ] data structure) that has occurred but has not yet been applied to the token holder's balance is iterated through, where newBalance is multiplied by the split numerator and divided by the split denominator at each such split. Once all the split multipliers have been applied, the resulting newBalance (reflecting the current split-updated balance) is returned from balanceOf(addr).

Accordingly, balanceOf(addr) may update the current balance (balances [addr]) for the address addr by one or more splits that have been declared for the token held in the address addr, but have not yet been applied to the current balance. Alternatively, if balances [addr] is called for an address that holds no tokens (of the particular type), then balances [addr] will be "0" and the newBalance value returned by balanceOf(addr) will be "0". The balance check method 142 (balanceOf( )) may be a split-related method 152 implemented in the security token 102, and may be executed on a network node 140 implementing the distributed ledger 122.

FIG. 7A is a block diagram illustrating a table of balances 105 and a splits data structure before a new token split is declared, e.g., using an example implementation of the method of FIG. 5. Specifically, the left side of FIG. 7A includes a table of balances 105 with three different addresses: A with a balance of 150 tokens 102, B with a balance of 25 tokens 102, and C with a balance of 75 tokens 102. Addresses A, B, and C may belong to the same or different token holders as long as they hold the same type of tokens 102, e.g., tokens representing shares of ABC Corporation. Each of addresses A, B, and C may have received their tokens by security token offering (STO), purchase, gift, inheritance, compensation, employee stock/token purchase program, etc. It is understood that this is example is merely exemplary and there could be many addresses holding tokens of a particular type, each address holding an integer number of tokens 102 (of at least "1"). While the addresses and token balances are illustrated as respective columns in tables of balances 105 herein, it is understood that the addresses and/or the token balances may each be implemented in any suitable data structure, e.g., they may be implemented in an array called balances [ ] that is addressable by address.

The right side of FIG. 7A illustrates a splits data structure for the token 102 held by addresses A, B, and C. In this example, the token 102 has undergone two different splits in its history, with split ratios of 2/1, 4/1. Assume that address A received it's 150 token after the first split (with a 2/1 ratio), address B received it's 25 tokens after the second split (with a 4/1 ratio), and address C received it's 75 tokens after the second split (with a 4/1 ratio). Assume further that addresses A, B, and C have not transferred any of their respective tokens since they received them. Accordingly, holdersSplit [A]=1 (meaning the token balance associated with address A has been updated for the first split (2/1), but not the second split (4/1)); holdersSplit [B]=2 (meaning the token balance associated with address B has been updated for the first split (2/1) and the second split (4/1)); and holdersSplit [C]-2 (meaning the token balance associated with address C has been updated for the first split (2/1) and the second split (4/1)). Accordingly, balanceOf(A) would return 600 (since the 4/1 split would be applied in newBalance that was returned); balanceOf(B) would return 25 (since both splits had already been accounted for in address B's balance); and balanceOf(C) would return 75 (since both splits had already been accounted for in address C's balance). The value of currentSplitIndex is 2 because that is the index of the most recent split declared for this token 102.

FIG. 7B is a block diagram illustrating a table of balances 105 and a splits data structure after the new token split is declared, e.g., using an example implementation of the method of FIG. 5. In examples, the tokens may have been previously issued by ABC Corporation. Assume that a new split is declared with a split ratio of 1/2 (considered a "reverse" split). To declare the split, ABC corporation (acting as the issuer 114) or the owner 112 would call the updateSplit (numerator, denominator) method 142 where numerator=1 and denominator=2 in this example. The at least one processor (e.g., in a network node 140) executing updateSplit (numerator, denominator) would then add a new Split object to the splits data structure, having a numerator element with a value of 1 and a denominator element with a value of 2 (denoted by the "1/2" in FIG. 7B). The at least one processor executing updateSplit (numerator,denominator) would also update currentSplitIndex to 3 because that is the index of the most recent split declared for this token 102.

The at least one processor may also audit the table of balances 105 to determine if any tokens need to be paid out/burned. In other words, the at least one processor may determine if and how many tokens 102 will be eliminated from existence after the new split (1/2) is applied and resulting fractional tokens are paid out. This may include calling the balanceOf( ) method 144 for each token holder (balanceOf(A), balanceOf(B), and balanceOf(C)), which would return newBalance values of 600, 12.5, and 37.5 for address A, B, and C, respectively. It should be noted that, for forward splits with an integer split ratio (e.g., 2/1, 3/1, 4/1, etc.), the audit is not performed because no fractional tokens 102 will result.

Since newBalance for addresses B and C is fractional, token holder(s) associated with addresses B and C will be paid out/compensated for their fractional tokens. Specifically, 0.5 of address B's tokens and 0.5 of address C's tokens 102 will be paid out, i.e., cashedOutTokenQuantity=0 (for address A)+0.5 (for address B)+0.5 (for address C)=1 token that will be paid out. Accordingly, the at least one processor may initiate at least one transaction to compensate the token holder(s) of addresses B and C for their respective half tokens 102. In some configurations, two different transactions will be executed, one transferring the market value of 0.5 tokens to the token holder associated with address B and another transferring the market value of 0.5 tokens to the token holder associated with address C. Alternatively, the token holder(s) associated with both addresses B and C may be compensated in a single transaction. The compensating transaction(s) may include the transfer of cryptocurrency (e.g., Ether) and may be recorded on a distributed ledger 122 (e.g., an Ethereum blockchain).

Optionally, the at least one processor may update the token balances (e.g., in the table of balances 105) for the address(es) that will have fractional tokens paid out/burned following the new split. In the example above, this may include calling the update balances method 146 (updateBalances( )) for address B and address C to update each token balance to 0. In some configurations, paying out/burning tokens may include invoking the transfer( ) method 109.

The at least one processor may also update the total number of outstanding security tokens 102 following the new split, i.e., to reduce the total number of outstanding security tokens 102 by the number tokens paid out/burned in response to the new split (cashedOutTokenQuantity). This may include calling the splitTotal Supply (cashedOutTokenQuantity)) method 148.

The at least one processor may also check if any token holders need to be removed from the table of balances 105 following the new split (of 1/2). In this example, each address still holds at least one token following the new split, so no token holders/addresses need to be removed from the table of balances 105. However, if address Z only included 0.5 tokens following the new split, which were then paid out, address Z would then be removed from the table of balances, e.g., with a removeShareholder (Z) method 150 call.

This example implementation of declaring a token split is performed without actually changing the token balances for all addresses in the table of balances 105 in the security token 102. In other words, this example implementation of token splitting does not call the update balances method 146. Accordingly, this example implementation of token splitting reduces blockchain-related fees (gas) that would otherwise be incurred if the token balances (in the table of balances 105) were updated. For example, holdersSplit [ ] is not updated in response to the splitting of a token, and balanceOf( ) is free to call. Only when tokens are subsequently transferred (e.g., as described in FIGS. 8A-B below) will the token balances in the table of balances actually be updated, thus incurring blockchain-related fees (and holdersSplit [ ] be updated).

FIG. 8A is a block diagram illustrating a table of balances 105 and a splits data structure before a token transaction is performed, e.g., according to an example implementation of the method of FIG. 6. Specifically, FIG. 8A illustrates the table of balances 105 and the splits data structure resulting from FIG. 7B after a new split (with a split ratio of 1/2) is declared for the token 102.

Assume that the token holder associated with address A then initiates a transaction of 50 tokens to address B. This may include the token holder associated with address A calling the transfer( ) method 109. In example, this may include calling transfer (address B, 50) from the token holder's wallet or other computing device. At least one processor in a network node 140 may execute the transfer (address B, 50) call. The at least one processor may use the address invoking the transaction (address A) as the transferor address. If necessary (i.e., if address B wasn't already a token holder), the at least one processor would call an add shareholder (e.g., addShareholder( ) method to add address B to the table of balances 105.

The at least one processor may then call the update balances method 146 (e.g., updateBalances(A, B)) as part of executing the transfer (address B, 50) call. The at least one processor may call balanceOf(A) and balanceOf(B) as part of executing the updateBalances(A, B) call, which will return newBalance values of 300 (150*4*1/2) and 12 (25*1/2−0.5 paid out already), respectively.

Using the returned newBalance values for addresses A (300) and B (12), the at least one processor may then update the token balances for addresses A and B in the table of balances, e.g., which is recorded on the distributed ledger 122. Specifically, the at least one processor may update the payor/transferor's balance as the newBalance—the quantity transferred, i.e., the at least one processor updates the token balance for address A to 300−50=250. The at least one processor may update the payee/transferee's balance as the newBalance+the quantity transferred, i.e., the at least one processor updates the token balance for address B to 12+50-62. In some configurations, the token balances may be updated (e.g., using updateBalances( )) as part of the transfer method 109.

FIG. 8B is a block diagram illustrating a table of balances 105 and a splits data structure after the token transaction is performed, e.g., according to the example implementation of the method of FIG. 6. Following the token transaction (of 50 tokens from address A to address B), the table of balances 105 is updated. Specifically, the balance for address A will be updated to 300−50 tokens that were transferred=250. The balance for address B will also be updated to 12+50 tokens received=62. Updating the balances may include committing a transaction to the distributed ledger 122. The balance for address C is not changed because address C was not involved in the token transaction.

Additionally, the holdersSplit data structure is updated for addresses A and B following the token transaction, e.g., holdersSplit [A]=holdersSplit [B]=3. The holdersSplit data structure is not updated for address C because address C was not involved in the token transaction.

Computer System Overview

Figure 9:
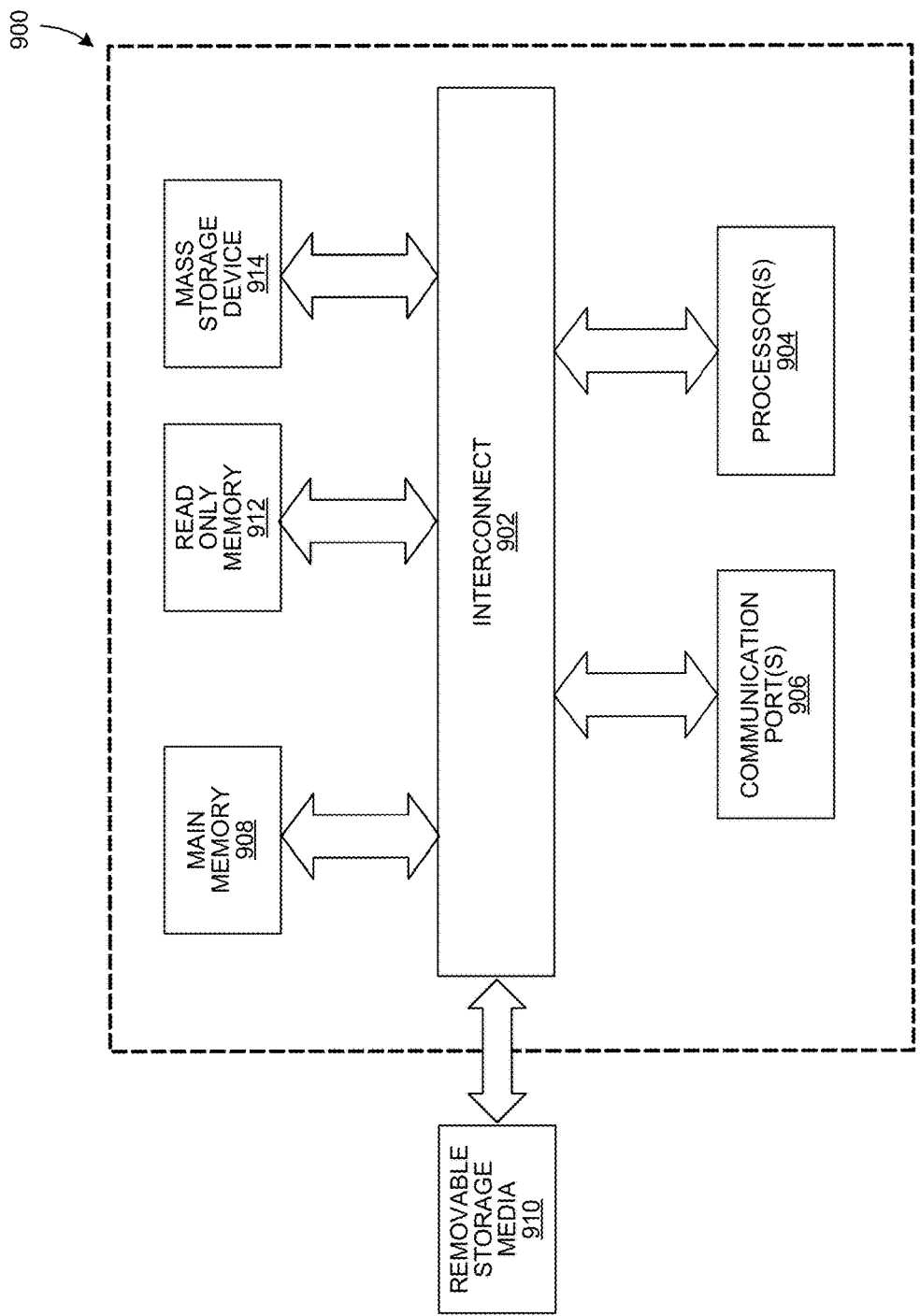
FIG. 9 is a block diagram illustrating an example computer system with which embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is a block diagram illustrating an example computer system 900 with which embodiments of the present disclosure may be utilized. According to the present example, the computer system 900 includes an interconnect 902, at least one processor 904, at least one communication port 906, at least one main memory 908, at least one removable storage media 910, at least one read only memory 912, and at least one mass storage device 914.

The at least one processor 904 can be any known processor. The at least one communication port 906 can be or include, In examples, any of an RS-232 port for use with a modem-based dialup connection, a 10/100 Ethernet port, or a Gigabit port using copper or fiber. The nature of the at least one communication port 906 may be chosen depending on a network such as a Local Area Network (LAN), Wide Area Network (WAN), or any network to which the computer system 900 connects. The at least one main memory 908 can be Random Access Memory (RAM), or any other dynamic storage device(s) commonly known in the art. The at least one read only memory 912 can be any static storage device(s) such as Programmable Read Only Memory (PROM) chips for storing static information such as instructions for the at least one processor 904.

The at least one mass storage device 914 can be used to store information and instructions. In examples, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 902 can be or include one or more buses, bridges, controllers, adapters, and/or point-to-point connections. Interconnect 902 communicatively couples the at least one processor 904 with the other memory, storage, and communication blocks. Interconnect 902 can be a PCI/PCI-X or SCSI based system bus depending on the storage devices used. The at least one removable storage media 910 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Figure 10:
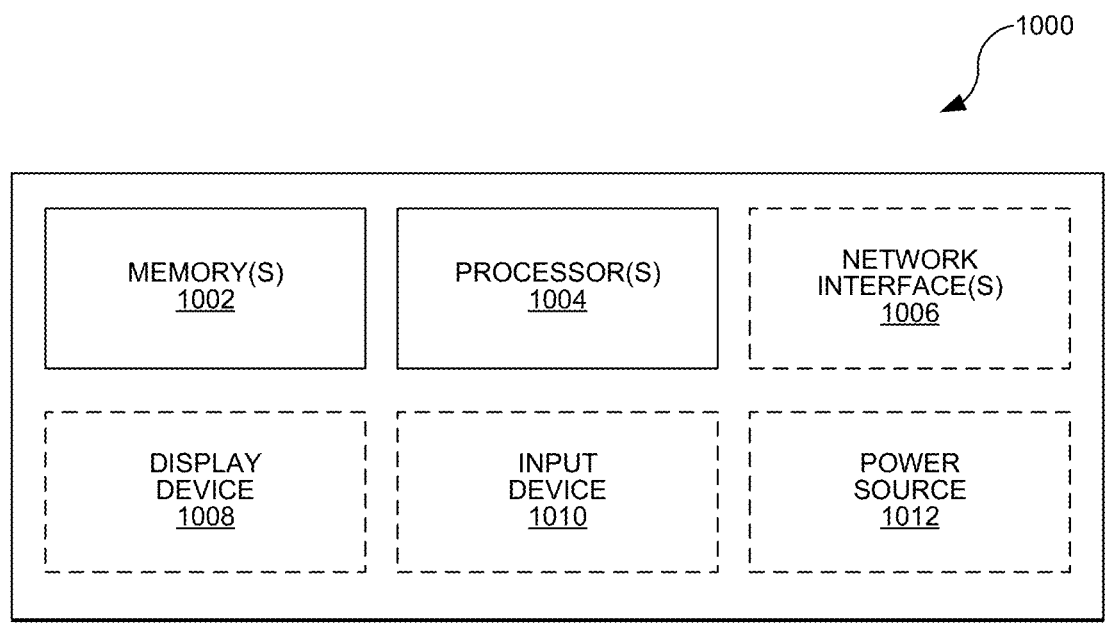
FIG. 10 is a block diagram illustrating another example computing device with which embodiments of the present disclosure may be utilized.

FIG. 10 is a block diagram illustrating another example computing device 1000 with which embodiments of the present disclosure may be utilized. The example computing device 1000 may be used to implement any of the global registry 108, owner 112, issuer 114, custodian 116, broker dealer 118, investor 120, one of the network nodes 140 storing a copy of the distributed ledger 122, security token exchange 124, and/or a virtual machine (e.g., Ethereum Virtual Machine) executing any of the smart contracts described herein. The computing device 1000 includes at least one memory 1002, at least one processor 1004, optional at least one network interface 1006, optional display device 1008, optional input device 1010, and optional power source 1012.

In examples, the at least one memory 1002 can be any device, mechanism, or populated data structure used for storing information. In examples, the at least one memory 1002 can be or include any type of volatile memory, nonvolatile memory, and/or dynamic memory. In examples, the at least one memory 1002 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 1002 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 1002. The at least one memory 1002 may be used to store instructions for running one or more applications or modules on the at least one processor 1004. In examples, the at least one memory 1002 could be used in one or more examples to house all or some of the instructions needed to execute the functionality discussed herein, e.g., in FIGS. 3-4.

The at least one processor 1004 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein (e.g., in FIGS. 3-4) may be implemented by the at least one processor 1004 and the at least one memory 1002.

In examples, the at least one optional network interface 1006 includes or is coupled to at least one optional antenna for communication with a network (such as one of the at least one networks 112 of system 100). In examples, the at least one optional network interface 1006 includes at least one of an Ethernet interface, a cellular radio access technology (RAT) radio, a Wi-Fi radio, a Bluetooth radio, or a near field communication (NFC) radio. In examples, the at least one optional network interface 1006 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 1006 includes a Wi-Fi (IEEE 802.11) radio configured to communicate with a wireless local area network that communicates with the remote server, rather than a wide area network. In examples, the at least one optional network interface 1006 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 1008 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 1010 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 1008 is combined with the optional at least one input device 1010 into a human machine interface (HMI) for user interaction with the computing device 1000. In examples, at least one optional power source 1012 is used to provide power to the various components of the computing device 1000.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". In examples, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, In examples, two devices may be coupled directly, or via one or more intermediary media or devices. As another example, devices may be coupled in such a way that information can be passed there between, while not sharing any physical connection with one another.

Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, In examples, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for using security tokens implementing smart-contract-based compliance rules that reference a global registry of investors based on smart contracts and for splittable security tokens. While detailed descriptions of one or more embodiments of the disclosure have been given above, various alternatives, modifications, and equivalents will be apparent to those skilled in the art without varying from the spirit of the disclosure. In examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a network node comprising: at least one processor; at least one memory communicatively coupled to the at least one processor; at least one network interface communicatively couple to the at least one processor; wherein the network node is configured to be within a plurality of network nodes communicatively coupled in a peer-to-peer network of network nodes implementing a distributed ledger; wherein the network node is configured to be communicatively coupled to at least one remotely located computing device through the at least one network interface; wherein the at least one processor is configured to: receive, from a remotely located computing device, a request to transfer a security token; execute a plurality of compliance rules associated with the security token, wherein at least one of the compliance rules is implemented using at least one smart contract, wherein the at least one smart contract references a global registry; and transfer the security token based on the execution of the compliance rules.

Example 2 includes the network node of Example 1, wherein the security token is a cryptographic token that represents an external, tradeable asset.

Example 3 includes the network node of any of Examples 1-2, wherein the global registry includes at least one personally identifiable information (PII) hash for each of at least one investor involved in the requested transfer, wherein the PII hash is committed to a distributed ledger, wherein each PII hash is updated when PII of a respective one of the multiple investors changes.

Example 4 includes the network node of any of Examples 1-3, wherein the global registry comprises at least one of the following attributes: an indication of whether at least one of the at least one investor qualifies under Securities and Exchange Commission (SEC) Regulation A; an indication of whether at least one of the at least one investor qualifies under SEC Regulation D; and an indication of whether at least one of the at least one investor qualifies under SEC Regulation S.

Example 5 includes the network node of Example 4, wherein the global registry further comprises at least one of the following attributes: an indication of whether anti-money laundering and know-your-customer (AML/KYC) checks have been performed for at least one investor associated with the security token transaction.

Example 6 includes the network node of Example 5, wherein the global registry further comprises at least one of the following attributes: an indication of whether a freeze has been placed on any of the at least one investor; an indication of whether a freeze has been placed on a security token; an indication of whether a freeze has been placed on a custodian associated with the security token transaction; and an indication of whether a freeze has been placed on any broker dealer associated with the security token transaction.

Example 7 includes the network node of Example 6, wherein a freeze is placed on or removed from any of the at least one investor by modifying attributes in an investor element in the global registry; wherein a freeze is placed on or removed from the security token by modifying attributes in a security token element in the global registry; wherein a freeze is placed on or removed from the custodian by modifying attributes in a custodian element in the global registry; and wherein a freeze is placed on or removed from any broker dealer associated with the security token transaction by modifying attributes in a broker dealer element in the global registry.

Example 8 includes the sys network node tem of any of Examples 6-7, wherein the global registry comprises a data storage smart contract that stores one or more of the attributes in the global registry.

Example 9 includes the network node of any of Examples 1-8, wherein the security token stores a table that indicates a length of time a particular security token has been owned by the investor.

Example 10 includes the network node of any of Examples 1-9, wherein the security token is implemented using an originating smart contract.

Example 11 includes the network node of any of Examples 1-10, wherein a record of an issuance of the security token is recorded on the distributed ledger.

Example 12 includes the network node of any of Examples 1-11, wherein a record of the transfer is committed to the distributed ledger.

Example 13 includes a computerized method for transferring a self-enforcing security token, wherein the computerized method is performed by a network node configured to be included within a plurality of network nodes in a peer-to-peer network of network nodes implementing a distributed ledger, wherein the network node is configured to be communicatively coupled to other network nodes in the peer-to-peer network, the computerized method comprising: receiving, from a remotely located computing device, a request to transfer a security token; executing a plurality of compliance rules associated with the security token, wherein at least one of the compliance rules is implemented using at least one smart contract, wherein the at least one smart contract references a global registry; and transferring the security token based on the execution of the compliance rules.

Example 14 includes the computerized method of Example 13, wherein the security token is a cryptographic token that represents an external, tradeable asset.

Example 15 includes the computerized method of any of Examples 13-14, wherein the global registry includes at least one personally identifiable information (PII) hash for each of at least one investor involved in the requested transfer, wherein the PII hash is committed to a distributed ledger, wherein each PII hash is updated when PII of a respective one of the multiple investors changes.

Example 16 includes the computerized method of any of Examples 13-15, wherein the global registry comprises at least one of the following attributes: an indication of whether at least one of the at least one investor qualifies under Securities and Exchange Commission (SEC) Regulation A; an indication of whether at least one of the at least one investor qualifies under SEC Regulation D; and an indication of whether at least one of the at least one investor qualifies under SEC Regulation S.

Example 17 includes the computerized method of Example 16, wherein the global registry further comprises at least one of the following attributes: an indication of whether anti-money laundering and know-your-customer (AML/KYC) checks have been performed for at least one investor associated with the security token transaction; and an indication of a length of time a particular security token has been owned by the investor.

Example 18 includes the computerized method of Example 17, wherein the global registry further comprises at least one of the following attributes: an indication of whether a freeze has been placed on any of the at least one investor; an indication of whether a freeze has been placed on a security token; an indication of whether a freeze has been placed on a custodian associated with the security token transaction; and an indication of whether a freeze has been placed on any broker dealer associated with the security token transaction.

Example 19 includes the computerized method of Example 18, wherein a freeze is placed on or removed from any of the at least one investor by modifying attributes in an investor element in the global registry; wherein a freeze is placed on or removed from the security token by modifying attributes in a security token element in the global registry; wherein a freeze is placed on or removed from the custodian by modifying attributes in a custodian element in the global registry; and wherein a freeze is placed on or removed from any broker dealer associated with the security token transaction by modifying attributes in a broker dealer element in the global registry.

Example 20 includes the computerized method of any of Examples 18-19, wherein the global registry comprises a data storage smart contract that stores one or more of the attributes in the global registry.

Example 21 includes the computerized method of any of Examples 13-20, wherein the security token stores a table that indicates a length of time a particular security token has been owned by the investor.

Example 22 includes the computerized method of any of Examples 13-21, wherein the security token is implemented using an originating smart contract.

Example 23 includes the computerized method of any of Examples 13-22, wherein a record of an issuance of the security token is recorded on the distributed ledger.

Example 24 includes the computerized method of any of Examples 13-23, wherein a record of the transfer is committed to the distributed ledger.

Example 25 includes a system, comprising: a plurality of network nodes communicatively coupled in a peer-to-peer network of network nodes implementing a distributed ledger, each network node comprising: at least one processor; at least one memory communicatively coupled to the at least one processor; wherein the at least one processor is configured to: receive, from a remotely located computing device, a request to transfer a smart-contract-based security token; execute a plurality of smart-contract-based compliance rules associated with the security token; and transfer the security token based on the execution of the compliance rules, wherein the transfer comprises updating a table of balances in the security token; the security token stored on the distributed ledger, wherein the security token is a cryptographic token that represents an external, tradeable asset, wherein the security token references the plurality of smart-contract-based compliance rules that are associated with the security token, and wherein at least one of the smart-contract-based compliance rules references a smart-contract-based global registry; and the smart-contract-based global registry, comprising: at least one personally identifiable information (PII) hash for each of at least one investor; indications of whether at least one of the at least one investor qualifies under Securities and Exchange Commission (SEC) Regulation A, Regulation S, and Regulation D; and an indication of whether anti-money laundering and know-your-customer (AML/KYC) checks have been performed by a broker dealer associated with the security token transaction.

Example 26 includes the system of Example 25, wherein the global registry further comprises at least one of the following attributes: an indication of whether a freeze has been placed on any of the at least one investor; an indication of whether a freeze has been placed on a security token; an indication of whether a freeze has been placed on a custodian associated with the security token transaction; and an indication of whether a freeze has been placed on any broker dealer associated with the security token transaction.

Example 27 includes the system of Example 26, wherein a freeze is placed on or removed from any of the at least one investor by modifying attributes in an investor element in the global registry; wherein a freeze is placed on or removed from the security token by modifying attributes in a security token element in the global registry; wherein a freeze is placed on or removed from the custodian by modifying attributes in a custodian element in the global registry; and wherein a freeze is placed on or removed from any broker dealer associated with the security token transaction by modifying attributes in a broker dealer element in the global registry.

Example 21 includes the system of any of Examples 25-27, wherein the security token stores a table that indicates a length of time a particular security token has been owned by a particular investor.

Example 22 includes a network node comprising: at least one processor; at least one memory communicatively coupled to the at least one processor; at least one network interface communicatively couple to the at least one processor; wherein the network node is configured to be within a plurality of network nodes communicatively coupled in a peer-to-peer network of network nodes implementing a distributed ledger; wherein the network node is configured to be communicatively coupled to at least one remotely located computing device through the at least one network interface; wherein the at least one processor is configured to: determine a split ratio for a new split of security tokens held in at least one address of the distributed ledger; and store an indication of the split ratio without updating token balances for all of the at least one address in a list of addresses holding at least one of the security tokens.

Example 23 includes the network node of Example 22, wherein the at least one processor is further configured to: determine that a new transfer of a quantity of the security tokens, from a first address to a second address, has been requested; determine a split-updated token balance for each of the first address and the second address based on at least the stored indication of the split ratio; and update token balances for the first address and the second address based on the split-updated balances for the first address and the second address.

Example 24 includes the network node of any of Examples 22-23, wherein the at least one processor is further configured to: store an indication that all splits have been accounted for in the token balances for the first address and the second address.

Example 25 includes the network node of any of Examples 22-24, wherein the at least one processor is further configured to: determine a number of the security tokens that will be paid out in response to the new split; and initiate at least one transaction to compensate each security token holder associated with an address, which will possess a fractional security token following the new split, for their respective fractional security token.

Example 26 includes the network node of Example 25, wherein the at least one processor is further configured to: update the total number of outstanding security tokens following the new split; and remove each of the at least one address, which will possess less than one security token following the new split, from the list of addresses holding at least one of the security tokens.

Example 27 includes the network node of any of Examples 22-26, wherein the security tokens are cryptographic tokens that each represents an external, tradeable asset.

Example 28 includes the network node of any of Examples 22-27, wherein the security tokens are implemented using an originating smart contract.

Example 29 includes the network node of any of Examples 23-28, wherein determining the split-updated token balance for each of the first address and the second address incurs no blockchain-related fees.

Example 30 includes the network node of any of Examples 23-29, wherein updating token balances for the first address and the second address incurs block-chain related fees.

Example 31 includes the network node of any of Examples 22-30, wherein the at least one processor is further configured to store split ratios for all splits in the history of the security tokens in a multi-object data structure.

Example 32 includes the network node of Example 31, wherein the at least one processor is further configured to maintain an address-specific index to the multi-object data structure, for each address holding at least one of the security tokens, wherein each address-specific index indicates a split ratio that was most recently applied to a token balance associated with the respective address.

Example 33 includes the network node of any of Examples 31-32, wherein the at least one processor is further configured to maintain a current index to the multi-object data structure indicating the most recent split for the security tokens.

Example 34 includes a computerized method for transferring a self-enforcing security token, wherein the computerized method is performed by a network node configured to be included within a plurality of network nodes in a peer-to-peer network of network nodes implementing a distributed ledger, wherein the network node is configured to be communicatively coupled to other network nodes in the peer-to-peer network, the computerized method comprising: determining a split ratio for a new split of security tokens held in at least one address of the distributed ledger; and storing an indication of the split ratio without updating token balances for all of the at least one address in a list of addresses holding at least one of the security tokens.

Example 35 includes the method of Example 34, further comprising: determining that a new transfer of a quantity of the security tokens, from a first address to a second address, has been requested; determining a split-updated token balance for each of the first address and the second address based on at least the stored indication of the split ratio; and updating token balances for the first address and the second address based on the split-updated balances for the first address and the second address.

Example 36 includes the method of any of Examples 34-35, further comprising: storing an indication that all splits have been accounted for in the token balances for the first address and the second address.

Example 37 includes the method of any of Examples 34-36, further comprising: determining a number of the security tokens that will be paid out in response to the new split; and initiating at least one transaction to compensate each security token holder associated with an address, which will possess a fractional security token following the new split, for their respective fractional security token.

Example 38 includes the method of Example 37, further comprising: updating the total number of outstanding security tokens following the new split; and removing each of the at least one address, which will possess less than one security token following the new split, from the list of addresses holding at least one of the security tokens.

Example 39 includes the method of any of Examples 34-38, wherein the security tokens are cryptographic tokens that each represents an external, tradeable asset.

Example 40 includes the method of any of Examples 34-39, wherein the security tokens are implemented using an originating smart contract.

Example 41 includes the method of any of Examples 35-40, wherein determining the split-updated token balance for each of the first address and the second address incurs no blockchain-related fees.

Example 42 includes the method of any of Examples 35-41, wherein updating token balances for the first address and the second address incurs block-chain related fees.

Example 43 includes the method of any of Examples 34-42, wherein the at least one processor is further configured to store split ratios for all splits in the history of the security tokens in a multi-object data structure.

Example 44 includes the method of Example 43, further comprising maintaining an address-specific index to the multi-object data structure, for each address holding at least one of the security tokens, wherein each address-specific index indicates a split ratio that was most recently applied to a token balance associated with the respective address.

Example 45 includes the method of any of Examples 43-44, further comprising maintaining a current index to the multi-object data structure indicating the most recent split for the security tokens.

What is claimed is:

1. A network node comprising:
   at least one processor;
   at least one memory communicatively coupled to the at least one processor;
   at least one network interface communicatively couple to the at least one processor;
   wherein the network node is configured to be within a plurality of network nodes communicatively coupled in a peer-to-peer network of network nodes implementing a distributed ledger; and
   wherein the network node is configured to be communicatively coupled to at least one remotely located computing device through the at least one network interface;
   wherein the at least one processor is configured to:
      receive, from a remotely located computing device, a request to transfer a security token;
      execute a plurality of compliance rules associated with the security token, wherein at least one of the plurality of compliance rules is implemented using at least one smart contract, wherein the at least one smart contract references a global registry; and transfer the security token based on the execution of the plurality of compliance rules, wherein the global registry comprises at least one personally identifiable information (PII) hash for each of at least one investor associated with the transfer of the security token, wherein the at least one PII hash for each of the at least one investor is committed to the distributed ledger, wherein each of the at least one PII hash is updated when PII of a respective investor of the at least one investor changes.

2. The network node of claim 1, wherein the security token is a cryptographic token that represents an external, tradeable asset.

3. The network node of claim 1, wherein the global registry comprises indication of at least one of:
whether an offering of the security token qualifies under Securities and Exchange Commission (SEC) Regulation A;
whether at least one of the at least one investor qualifies under SEC Regulation D; or
whether the offering of the security token qualifies under SEC Regulation S.

4. The network node of claim 3, wherein the global registry further comprises indication of at least one of:
whether anti-money laundering and know-your-customer (AML/KYC) checks have been performed for the at least one investor associated with the transfer of the security token; or
a length of time a particular security token has been owned by a particular investor.

5. The network node of claim 4, wherein the global registry further comprises indication of at least one of:
whether a freeze has been placed on any of the at least one investor;
whether a freeze has been placed on the security token;
whether a freeze has been placed on a custodian associated with the transfer of the security token; or
whether a freeze has been placed on any broker dealer associated with the transfer of the security token.

6. The network node of claim 5, further comprising at least one of:
wherein a freeze is placed on or removed from any of the at least one investor by modifying first attributes in an investor element in the global registry;
wherein a freeze is placed on or removed from the security token by modifying second attributes in a security token element in the global registry;
wherein a freeze is placed on or removed from the custodian by modifying third attributes in a custodian element in the global registry; or
wherein a freeze is placed on or removed from any broker dealer associated with the transfer of the security token by modifying fourth attributes in a broker dealer element in the global registry.

7. The network node of claim 5, wherein the global registry comprises a data storage smart contract that stores at least one indication in the global registry.

8. The network node of claim 1, wherein the security token stores a table that indicates a length of time a particular security token has been owned by a particular investor.

9. The network node of claim 1, wherein the security token is implemented using an originating smart contract.

10. The network node of claim 1, wherein a record of an issuance of the security token is recorded on the distributed ledger.

11. The network node of claim 1, wherein a record of the transfer of the security token is committed to the distributed ledger.

12. The network node of claim 1, wherein the request to transfer the security token is a request to transfer the security token from a first address to a second address, wherein the at least one processor is configured to:
before the request to transfer the security token is received, determine a split ratio for a new split of security tokens held in at least one address of the distributed ledger without updating token balances on the distributed ledger;
determine a split-updated token balance for at least the first address based on at least an indication of the split ratio; and
wherein the token balances on the distributed ledger are updated for at least the first address based on the split-updated token balance for at least the first address as part of a transaction associated with the transfer of the security token.

13. A computerized method for transferring a self-enforcing security token, wherein the computerized method is performed by a network node configured to be included within a plurality of network nodes in a peer-to-peer network of network nodes implementing a distributed ledger, wherein the network node is configured to be communicatively coupled to other network nodes in the peer-to-peer network, the computerized method comprising:
receiving, from a remotely located computing device, a request to transfer a security token;
executing a plurality of compliance rules associated with the security token, wherein at least one of the plurality of compliance rules is implemented using at least one smart contract, wherein the at least one smart contract references a global registry; and
transferring the security token based on the execution of the plurality of compliance rules, wherein the global registry comprises at least one personally identifiable information (PII) hash for each of at least one investor associated with the transfer of the security token, wherein the at least one PII hash for each of the at least one investor is committed to the distributed ledger, wherein each of the at least one PII hash is updated when PII of a respective investor of the at least one investor changes.

14. The computerized method of claim 13, wherein the security token is a cryptographic token that represents an external, tradeable asset.

15. The computerized method of claim 13, wherein the global registry comprises indication of at least one of:
whether an offering of the security token qualifies under Securities and Exchange Commission (SEC) Regulation A;
whether at least one of the at least one investor qualifies under SEC Regulation D; or
whether the offering of the security token qualifies under SEC Regulation S.

16. The computerized method of claim 13, wherein the global registry further comprises indication of at least one of:
whether anti-money laundering and know-your-customer (AML/KYC) checks have been performed for at least one investor associated with the transfer of the security token; or
a length of time a particular security token has been owned by a particular investor.

17. The computerized method of claim 16, wherein the global registry further comprises indication of at least one of:
- whether a freeze has been placed on any of the at least one investor;
- whether a freeze has been placed on the security token;
- whether a freeze has been placed on a custodian associated with the transfer of the security token; or
- whether a freeze has been placed on any broker dealer associated with the transfer of the security token.

18. The computerized method of claim 17, further comprising at least one of:
- wherein a freeze is placed on or removed from any of the at least one investor by modifying first attributes in an investor element in the global registry;
- wherein a freeze is placed on or removed from the security token by modifying second attributes in a security token element in the global registry;
- wherein a freeze is placed on or removed from the custodian by modifying third attributes in a custodian element in the global registry; or
- wherein a freeze is placed on or removed from any broker dealer associated with the transfer of the security token by modifying fourth attributes in a broker dealer element in the global registry.

19. The computerized method of claim 17, wherein the global registry comprises a data storage smart contract that stores at least one indication in the global registry.

20. The computerized method of claim 13, wherein the security token stores a table that indicates a length of time a particular security token has been owned by a particular investor.

21. The computerized method of claim 13, wherein the security token is implemented using an originating smart contract.

22. The computerized method of claim 13, wherein a record of an issuance of the security token is recorded on the distributed ledger.

23. The computerized method of claim 13, wherein a record of the transfer of the security token is committed to the distributed ledger.

24. The computerized method of claim 13, wherein the request to transfer the security token is a request to transfer the security token from a first address to a second address, wherein the computerized method further comprises:
- before the request to transfer the security token is received, determining a split ratio for a new split of security tokens held in at least one address of the distributed ledger without updating token balances on the distributed ledger;
- determining a split-updated token balance for at least the first address based on at least an indication of the split ratio; and
- wherein the token balances on the distributed ledger are updated for at least the first address based on the split-updated token balance for at least the first address as part of a transaction associated with the transfer of the security token.

* * * * *